US008341728B2

(12) United States Patent
Kaihoko et al.

(10) Patent No.: US 8,341,728 B2
(45) Date of Patent: Dec. 25, 2012

(54) AUTHENTICATION DEVICE AND AUTHENTICATION CONTROL METHOD OF A SEMICONDUCTOR CHIP

(75) Inventors: Seigo Kaihoko, Yokohama (JP); Ai Yodokawa, Yokohama (JP); Nobuo Takahashi, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 858 days.

(21) Appl. No.: 12/257,033

(22) Filed: Oct. 23, 2008

(65) Prior Publication Data

US 2009/0077630 A1 Mar. 19, 2009

(30) Foreign Application Priority Data

Nov. 1, 2007 (JP) ................................. 2007-285599

(51) Int. Cl.
*G06F 7/04* (2006.01)
*G06F 12/00* (2006.01)
*G06F 12/14* (2006.01)
*G06F 13/00* (2006.01)
*G11C 7/00* (2006.01)

(52) U.S. Cl. ..................... 726/16; 726/2; 726/17; 726/9; 726/30; 726/26; 713/170; 713/184; 713/185; 713/186; 713/194; 711/145; 711/163

(58) Field of Classification Search ..................... 726/26
See application file for complete search history.

(56) References Cited

U.S. PATENT DOCUMENTS

| 2002/0062288 | A1* | 5/2002 | Ooishi ............................. 705/52 |
| 2003/0084165 | A1* | 5/2003 | Kjellberg et al. ............. 709/227 |
| 2004/0232247 | A1* | 11/2004 | Tsunoda et al. .............. 235/492 |
| 2006/0165263 | A1 | 7/2006 | Niitsuma |
| 2008/0183841 | A1* | 7/2008 | Isokawa et al. ............... 709/217 |

FOREIGN PATENT DOCUMENTS

| JP | 2001-217821 | 8/2001 |
| JP | 2002-318635 | 10/2002 |
| JP | 2003-203213 | 7/2003 |
| JP | 2005-78185 | 3/2005 |
| JP | 2006-202212 | 8/2006 |
| JP | 2007-233989 | 9/2007 |
| JP | 2008-524753 | 7/2008 |
| WO | 2006/069194 | 6/2006 |

OTHER PUBLICATIONS

Japanese Office Action dated Mar. 27, 2012 issued in corresponding Japanese Patent Application No. 2007-285599.

* cited by examiner

*Primary Examiner* — Nathan Flynn
*Assistant Examiner* — Bryan Wright
(74) *Attorney, Agent, or Firm* — Staas & Halsey LLP

(57) ABSTRACT

An authentication device and method of a semiconductor chip which sends and receives authentication information, performs a login process for permitting an input to the semiconductor chip and an output from the semiconductor chip, controls acquisition of the authentication information and controls installation or uninstallation of a loadable program, assignment of a session to the loadable program unit, and use of the loadable program unit based on the session.

22 Claims, 35 Drawing Sheets

FIG.6

DEFINITION OF USER TYPE

| TYPES | DEFINITIONS | NUMBERS OF GENERATION |
|---|---|---|
| INITIAL USER | USER FIRST REGISTERED WITH APPARATUS AND CAPABLE GENERATING USER(S) | 1 |
| USER | USER(S) OTHER THAN INITIAL USER | UNLIMITED |

FIG.7

DEFINITION OF OF PI VALUE

| DATA NAMES | DEFINITIONS |
|---|---|
| PIDR-P | GENERATED UPON REGSTERATION OF USER INFORMATION REFERABLE OUTSIDE OF AUTHENTICATION INFORMATION MANAGEMENT SYSTM |
| PIDR-H | GENERATE UPON REGSTERATION OF USER INFORMATION NOT REFERABLE DUE TO ENCRYPTION WITH KEY ATTACHED TO AUTHENTICATION INFORMATION MANAGEMENT SYSTM WHEN MOVED TO AUTHENTICATION INFORMATION MANAGEMENT SYSTEM |
| PIPR-P | GENERATED UPON REGSTERATION OF USER INFORMATION, UPDATED UPON CHANGE IN LOGIN AUTHENTICATION INFORMATION, AND REFERABLE OUTSIDE OF AUTHENTICATION INFORMATION MANAGEMENT SYSTM |
| PIPR-H | GENERATE UPON REGSTERATION OF LOGIN AUTHENTICATION INFORMATION, UPDATED UPON CHANGE IN LOGIN AUTHENTICATION INFORMATION, AND NOT REFERABLE DUE TO ENCRYPTION WITH KEY ATTACHED TO AUTHENTICATION INFORMATION MANAGEMENT SYSTM WHEN MOVED TO OUTSIDE OF AUTHENTICATION INFORMATION MANAGEMENT SYSTEM |

FIG.10

| FILE VERSION |
|---|
| APPLICATION ID |
| COMMON KEY DATA LENGTH |
| COMMON KEY (ENCRYPTED WITH PUBLIC KEY FOR LOADABLE) |
| LOADABLE INFORMATION |
| LOADABLE PROGRAM DATA LENGTH |
| LOADABLE PROGRAM (BODY) (ENCRYPTED WITH (COMMON) ENCRYPTION KEY FOR LOADABLE) |
| SIGNATURE DATA LENGTH |
| SIGNATURE |

FIG.11

FILE CONFIGRATION DATA

| DATA NAMES | GENERAL DESCRIPTIONS |
|---|---|
| FILE VERSION | DEFINITION IN CONSIDERATION OF POTENTIAL EXAMPLE) 0 : NON-SETTING 1 : AES 128 BITS, RSA 2048 BITS 3DES-EDE2 64BITS , SHA-1 |
| APPLICATION ID | SEE FIGS.11 AND 12 |
| COMMON KEY DATA LENGTH | INDICATES DATA LENGTH OF COMMON KEY |
| COMMON KEY | COMMON KEY DATA |
| LOADABLE INFORMATION | SEE FIGS.13 AND 14 |
| LOADABLE PROGRAM DATA LENGTH | INDICATES DATA LENGTH OF LOADABLE PROGRAM(BODY) |
| LOADABLE PROGRAM (BODY) | LOADABLE PROGRAM (BODY) DATA |
| SIGNATURE DATA LENGTH | INDICATES DATA LENGTH OF SIGNATURE |
| SIGNATURE | SIGNATURE DATA |

FIG.12

| MANUFACTURING COMPANY (MANUFACTURER) NUMBER |
|---|
| APPROVAL (ISSUANCE) NUMBER |
| RESERVE |

FIG.13

APPLICATION ID

| DATA NAMES | GENERAL DESCRIPTIONS |
|---|---|
| MANUFACTURING COMPANY (MANUFACTURER) NUMBER | EXAMPLE) 0: FUJITSU  OTHER THAN 0 : OTHER THAN FUJITSU NUMBER IS ARBITRARILY. ASSIGNED EXCEPT FOR FUJITSU |
| APPROVAL (ISSUANCE) NUMBER | APPROVAL NUMBER ASSIGNS NUMBER TO APPARATUS WHEN APPROVED BY MANUFACTURING COMPANY |
| RESERVE | ALL "0" WHEN NOT IN USE |

FIG.14

| WORK AREA SIZE |
| --- |
| NVRAM DATA AREA SIZE |
| NVRAM AREA SIZE (FOR TEMPORARY STORAGE) |
| RESERVE |

FIG.15

LOADABLE INFORMATION

| DATA NAMES | GENERAL DESCRIPTIONS |
|---|---|
| WORK AREA SIZE | WORK AREA SIZE USED BY INTERNAL LOADABLE PROGRAM |
| NVRAM DATA AREA SIZE | NVRAM DATA AREA SIZE USED BY INTERNAL LOADABLE PROGRAM |
| NVRAM AREA SIZE (FOR TEMPORARY STORAGE) | NVRAM AREA SIZE (FOR TEMPORARY STORAGE) USED BY INTERNAL LOADABLE PROGRAM |
| RESERVE | ALL "0" WHEN NOT IN USE |

FIG.29

| COMMON KEY ENCRYPTED WITH USER INFORMATION GENERATION PUBLIC KEY |
|---|
| PERSONAL DATA ENCRYPTED WITH ABOVE COMMON KEY (LOGIN AUTHENTICATION INFORMATION, USER RESOURCE) |
| SIGNATURE DATA GENERATED WITH USER INFORMATION GENERATION SECRET KEY |

AUTHENTICATION DEVICE AND AUTHENTICATION CONTROL METHOD OF A SEMICONDUCTOR CHIP

CROSS-REFERENCE TO RELATED APPLICATIONS

This application claims the benefit of priority from Japanese Patent Application No. 2007-285599 filed on Nov. 1, 2007, the entire contents of which are incorporated herein by reference.

BACKGROUND OF THE INVENTION

1. Field of the Invention

This application relates to a system and method of a security function.

2. Description of the Related Art

In tandem with the rapid advances in digitization and networking of information appliances, security technologies are considered fundamental for information appliances and indispensable to various services, such as digital contents distribution systems, telemedicine services or the like. Incorporated software programs (loadable programs) in security chips of various terminals require data authentication functions where biometric information management (biometrics), a password, and so on are used.

SUMMARY

According to one aspect of an embodiment, an authentication device of a semiconductor chip sending and receiving authentication information is provided. The authentication device comprises a login unit that performs a login process permitting an input to the semiconductor chip and an output from the semiconductor chip, a loadable program unit that is installable or uninstallable and controls acquisition of the authentication information, and a control unit that controls installation or uninstallation of a loadable program, assignment of a session to the loadable program unit, and use of the loadable program based on the session.

Additional aspects and/or advantages will be set forth in part in the description that follows, and in part, will become more apparent to those skilled in the art upon examination of the following or upon learning by practice of the invention.

BRIEF DESCRIPTION OF THE DRAWINGS

FIG. 6 shows user information;

FIG. 7 shows user information;

FIG. 10 shows a data format when a loadable program is transferred;

FIG. 11 shows a data format when a loadable program is transferred;

FIG. 12 shows a data format when a loadable program is transferred;

FIG. 13 shows a data format when a loadable program is transferred;

FIG. 14 shows a data format when a loadable program is transferred;

FIG. 15 shows a data format when a loadable program is transferred;

FIG. 29 shows a configuration of a user information file;

DETAILED DESCRIPTION OF THE PREFERRED EMBODIMENTS

Figure 1:
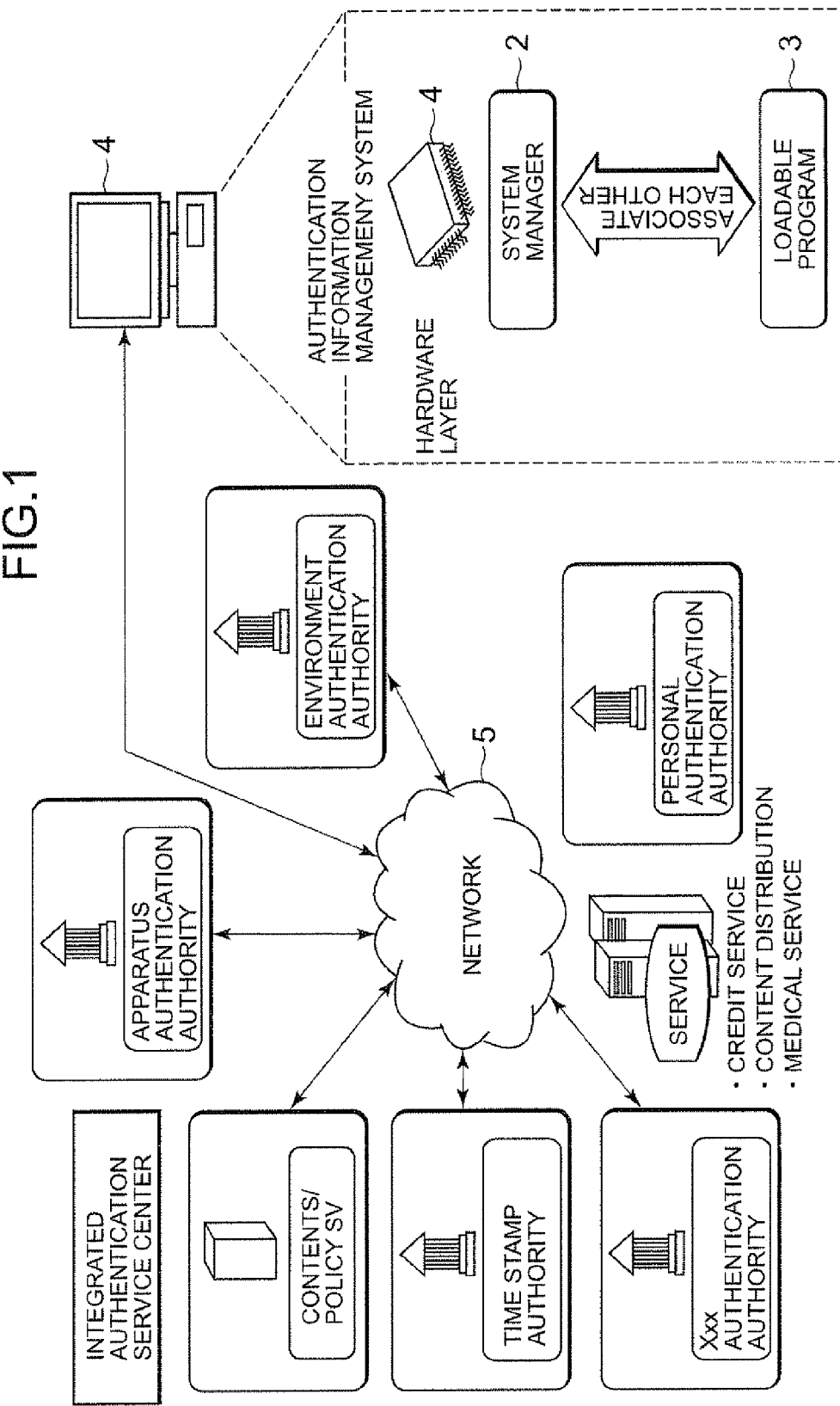
FIG. 1 shows an environment surrounding an apparatus providing data authentication.

Reference will now be made in detail to the embodiments, examples of which are illustrated in the accompanying drawings, wherein like reference numerals refer to the like elements throughout. The embodiments are described below to explain the present invention by referring to the figures.

FIG. 1 shows an environment surrounding an apparatus providing a data authentication function. A terminal 4 having the data authentication function used by a user is equipped with a security chip 1. The security chip 1 includes a system manager 2 executing managing operation(s) in the chip 1 in association with a loadable program 3, such as fingerprint authentication processing software which is loaded and executed as needed. The security chip 1 includes an authentication information management system of the terminal 4. Information such as a fingerprint obtained by the authentication information management system of the terminal 4 is sent to various authentication service centers via a network 5, and thereby user authentication is performed.

It is necessary that data association between the plurality of loadable programs and basic programs incorporated in the security chip be established without degrading strength of security. In addition it is also necessary to consider that a memory capacity of a memory unit in the security chip due to the plurality of resident loadable programs based on a plurality of pieces of registered user information may be reduced.

The following function(s) are provided for the security chip 1 (FIG. 1) in an embodiment.

A user management function includes operation(s) where a system (security chip) manages a user controlling the system and restricts use by other persons who are not registered with the system. The system permits use by the user registered with the system by login authentication. The system manages at least two types of users, that is, an initial user registered in an initial state and a secondary user registered by the initial user.

A channel management function includes operation(s) where a login (authenticating the user and the registered user) is necessary to allow the initial user and the secondary user to give instructions (sending commands) to the system. A channel is used for the purpose of identifying the user who sends the command, within the system. It is necessary that the channel be detected before the user logs in. A unique channel may be assigned to each of the users who logged in. Each user can be identified by detecting the channel through which the command is sent.

A loadable program replacement control (loader) function includes operation(s) where the system installs and uninstalls programs including for the purpose of replacing, such as a fingerprint authentication program, a vein authentication program, and loadable programs like a password authentication program or the like.

A session management function includes operation(s) where a session is defined including for the purpose of identifying the loadable program to which the command is sent, within the system. Upon installation of the loadable program, the system determines the session. The system manages execution of the loadable program with session numbers so that a certain session that corresponds to a specific loadable program becomes valid when the specific program is executed.

A function of managing user information (use of a PI value) generated upon registration of authentication information includes operation(s) when the user generates data used in the login authentication, the system generates a personal authentication identification value (PI value) with respect to each user.

The PI value is associated with a resource in the system generated after the login. The loadable program that is loaded to the system acquires the login authentication. The login authentication is not the authentication using such as biometric information which is processed in an external server. The login authentication is performed so that the user acquires a right to use the terminal his/her authentication. The PI value becomes the information closed within the terminal.

A secure export function of the user information includes operation(s) where the system securely exports user information necessary at the login authentication and a resource (for example, biometric authentication information) generated after the login, to outside of the system. The "export" unit, for example, moves the data from an inside of the security chip to a hard disk, etc., of the terminal on which the security chip is provided.

A user information import function includes operation(s) where the system securely imports user information necessary at the login authentication and a resource (for example, biometric authentication information) generated after the login, to the system. The "import" unit, for example, moves the data from hard disk, etc., of the terminal on which the security chip is provided, to the inside of the security chip.

A user authentication function includes operation(s) where the system permits use of the resource (for example, a key for encryption, hardware such as a fingerprint sensor when performing the fingerprint authentication or the like) associated with the personal authentication identification value (PI value), based on the completion of the login authentication.

A discrete operation from among the respective functions (loadable programs) and association between the necessary functions and the basic programs in the authentication information management system allows the embodiment to meet various needs. In addition, the embodiment provides services or functions under a robust security environment. Moreover, the plurality of users may share telemedicine service terminals or a dedicated/shared terminal (PCs or the like) in the embodiment.

Figure 2:
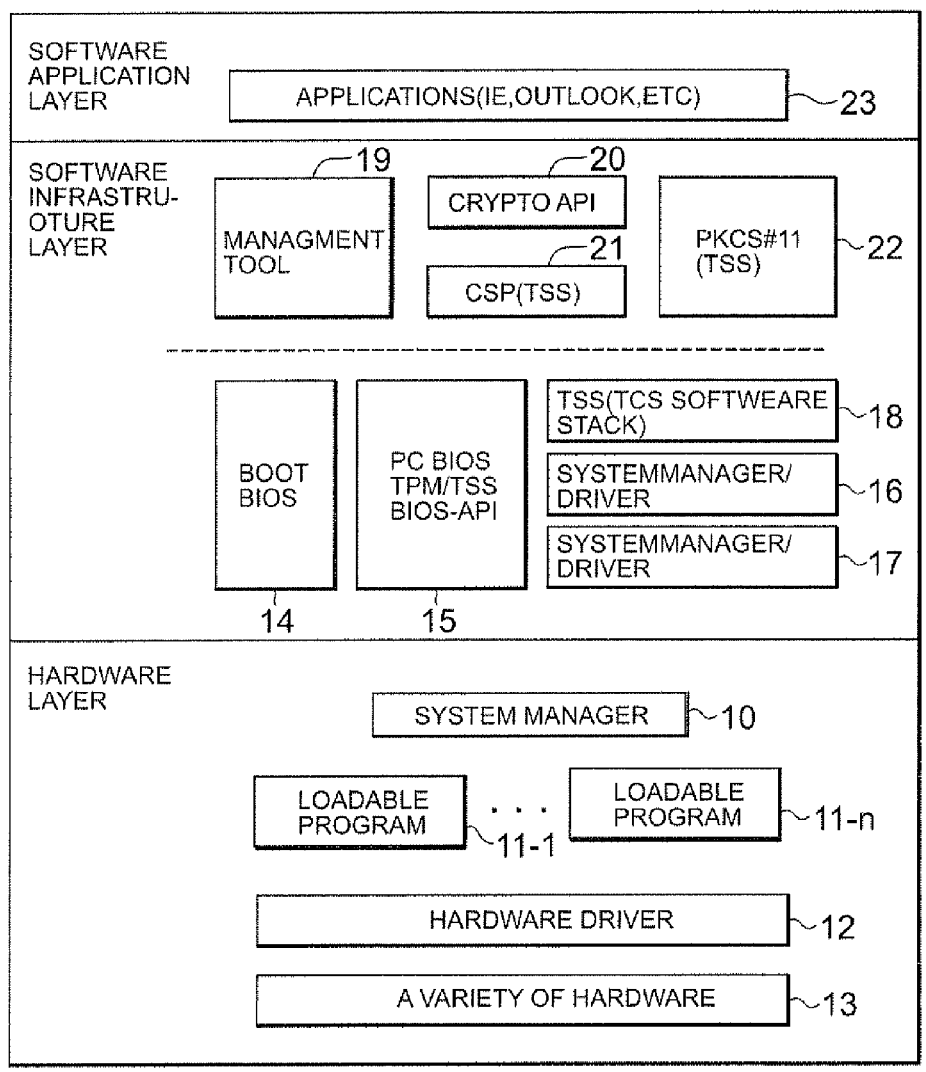
FIG. 2 shows a software configuration of an authentication information management system according to an embodiment.

FIG. 2 shows a software configuration of an authentication information management system according to an embodiment.

Each of the loadable programs in a Hardware Layer operates as an independent function. The Hardware Layer includes a system manager 10, a plurality of loadable programs 11-1 to 11-$n$, a variety of hardware 13, and a hardware driver 12. The system manager 10 manages the plurality of loadable programs 11-1 to 11-$n$, the variety of hardware 13, and the hardware driver 12.

A Software Infrastructure Layer is a layer of a BIOS-level. The Software Infrastructure Layer includes a system manager/driver Lib (library) 16, a system manager/driver 17, a boot BIOS 14, a PC BIOS TPM/TSS and BIOS-API 15, and TSS (TCS Software Stack) 18, TPM is an abbreviation of a Trusted Platform Module, the TSS is an abbreviation of TCG Software Stack, and the TCG is an abbreviation of a Trusted Computing Group. The TPM, the TSS, and the TCG implements standardized protocols that permit applications to operate securely. The Software Infrastructure Layer further includes an application management tool 19, a Crypto API 20 that is an application program interface for encryption, a TSS compliant CSP 21, and a PKCS#11 (TSS) 22. The CSP is an abbreviation of a Cryptographic Service Provider. The PKCS#11 is a package that encrypts according to the standards of a public key cryptosystem.

Figure 3:
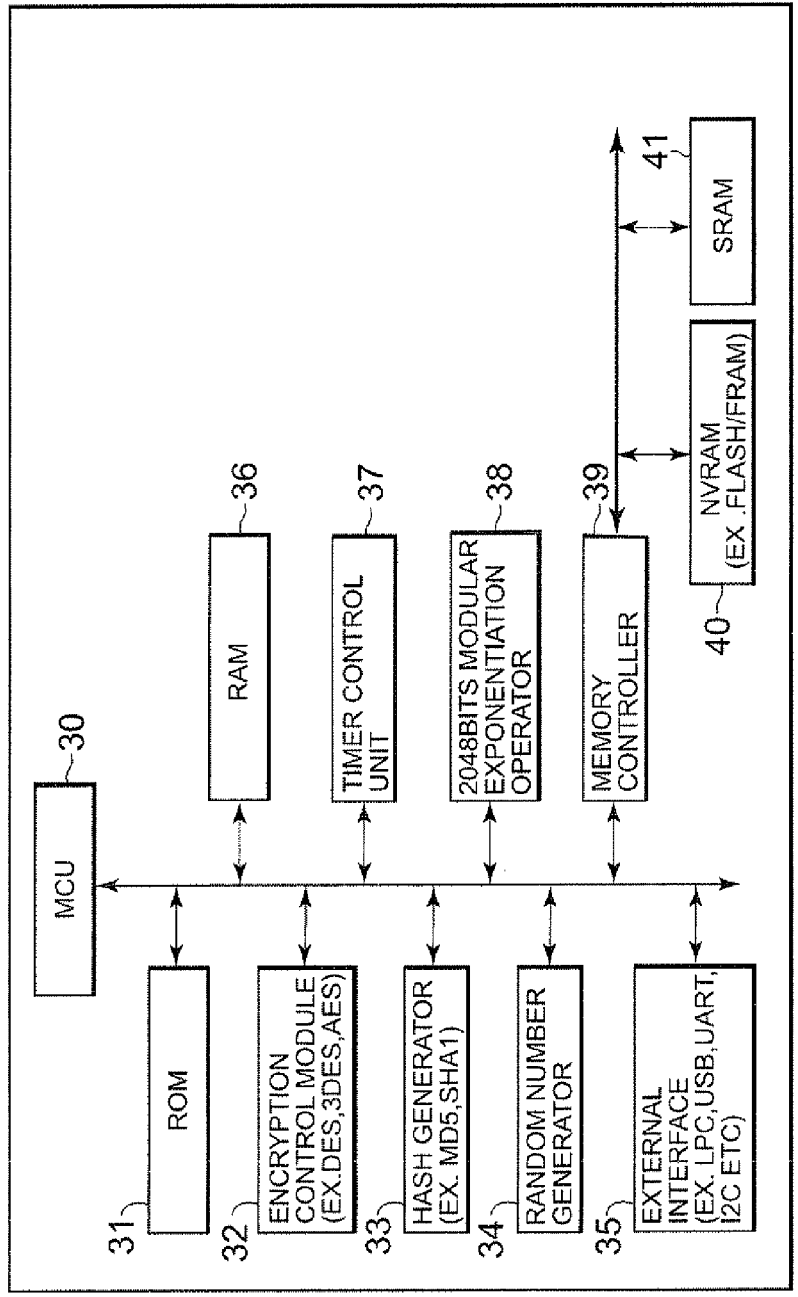
FIG. 3 shows a hardware configuration of an authentication information management system according to an embodiment.

A software application layer is an application layer visible from the terminal user and is, for example, Internet Explorer (IE), Outlook or the like. FIG. 3 shows hardware of an authentication information management system 42 according to an embodiment.

An MCU 30 executes a received instruction. A RAM 36 is a volatile memory and used as a work area. A ROM 31 is a non-volatile read-only memory and an execution program is provided therein. An NVRAM 40 is a non-volatile memory and mainly used as a program execution area and a data storing area for the loadable programs or the like. A memory controller 39 controls the NVRAM 40 and an SRAM 41. An encryption control module 32 is a logic for generating a key for the encryption. A hash generator 33 generates a hash value. A random number generator 34 generates random numbers necessary when the hash value and an encryption key are generated. A timer control unit 37 is used to acquire a time stamp or the like upon generation of the PI value. A 2048 bit modular exponentiation operator 38 performs a reminder operation necessary when the encryption in a public key system is processed. An external interface 35 is an interface coupling an authentication information management system (terminal) 42 to an outside, for communication.

Figure 4:
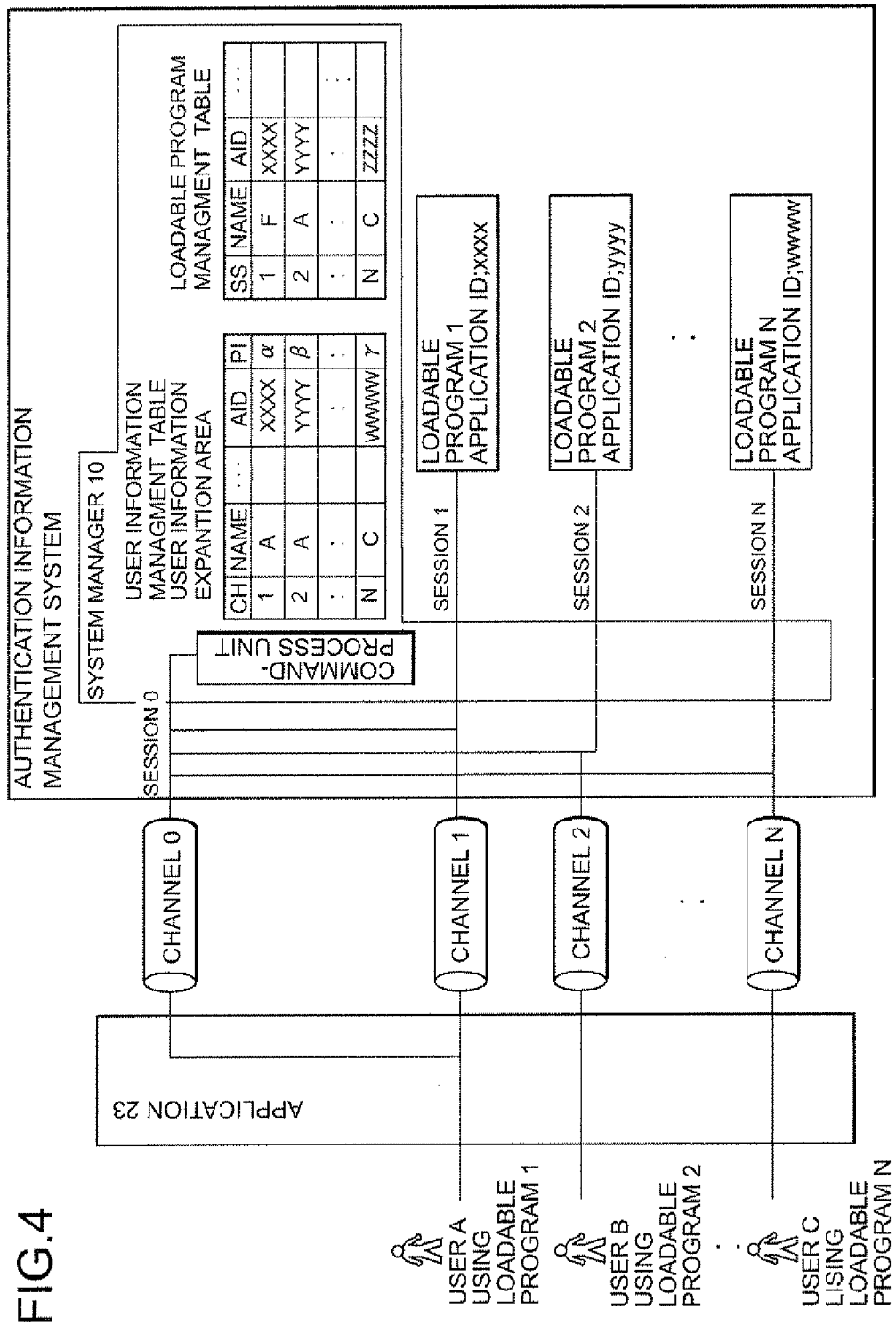
FIG. 4 shows channels according to an embodiment.

FIG. 4 shows channels according to an embodiment. Users A to C use the loadable programs 1 to N of the authentication information management system 42 via an application 23.

For example, the user A uses the loadable program 1, the user B uses the loadable program 2, and the user C uses the loadable program N. Each of the users uses the channels 1 to n dedicated for each user, thereby sending the commands to the loadable program 1 to N. A channel open command for opening the channel does not use the channels. In addition, a command for controlling the system also does not use the channels. In FIG. 4, the channel 0 is used to illustrate case(s) where the channels are not used. A command-process unit in the system manager 10 analyzes the channel open command issued from the user A and associates the channels 1 to n with the users A to C.

The system manager 10 includes a user information management table and a loadable program management table. The user information management table is provided in a user information expansion area and associates the users, the channels, and the loadable programs with each other. The user information management table associates the user names, the channels to be used, application IDs of the loadable programs to be used, and the PI values of the users acquired by the loadable programs with each other and stores associated information. The loadable program management table associates session numbers, names of the loadable programs, and the application IDs with each other and stores associated information. The association between the session numbers and the application IDs is acquired from the loadable program management table. The application ID of the loadable program which a certain user using a certain channel uses for his/her authentication is acquired from the user information management table. Owing to the information from these two tables, the application can determine the session number used when the certain user using the certain channel sends the command to the loadable program.

Figure 5:
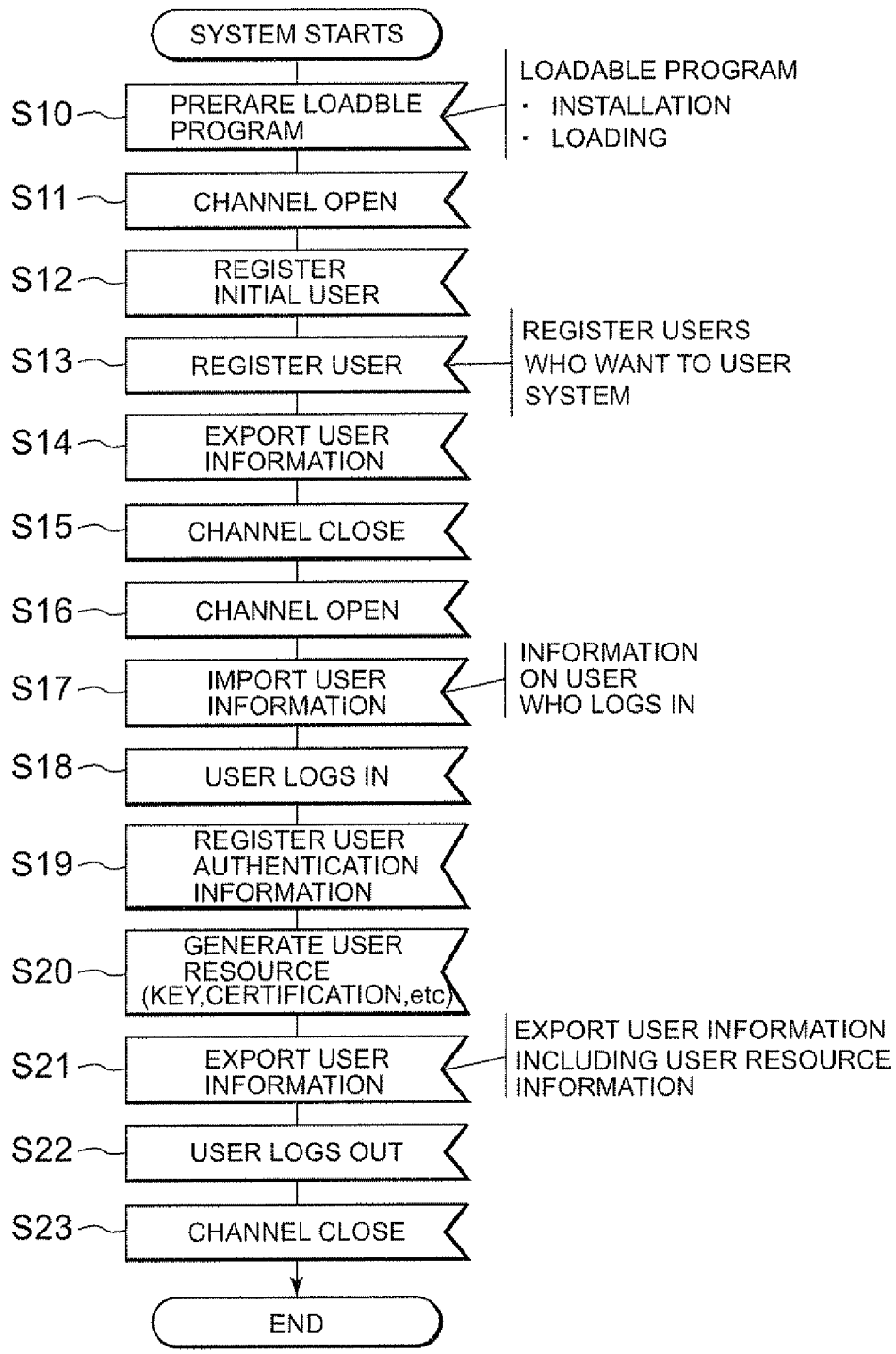
FIG. 5 shows a flowchart of an authentication information management system according to an embodiment.

FIG. 5 shows a flowchart of an authentication information management system according to an embodiment.

Both the common key encryption system and the public key encryption system may be used in the authentication information management system. All the software makes requests to the authentication information management system using the command(s).

The booted authentication information management system prepares for the loadable program in operation S10. For example, the authentication information management system prepares for the installation and the load of the loadable program. The channel to send the command to the authentication information management system is opened in operation S11. The initial user is registered in operation S12. The initial user is a user who is first permitted access to the authentication information management system and may correspond to an administrator of the authentication information management system. The initial user registers a person who wants to use the authentication information management system at the terminals as a user in operation S13. The user information is exported in operation S14. The channel is closed in operation S15. The operations S10 to S15 correspond to initial preparation. Encryption with the common key encryption system is used to encrypt the loadable program in the preparation of the loadable program in operation S10. The encryption with the public key encryption system is used to encrypt the user information upon the export of the user information in operation S14.

Operation S16 and the following operations show the case where the user uses the authentication information management system. The channel is opened in operation S16. The user information of the user who logs in is imported in operation S17. In operation S18, the user logs in. User authentication information is registered in operation S19. A user resource (for example, key, certificate or the like) is generated in operation S20. The user information including user resource information is exported in operation S21. The user logs out in operation S22. The channel is closed in operation S23, thereby terminating the process.

FIG. 6 shows exemplary user information. There are two types of users who are registered in FIG. 6, that is, the initial user and ordinary user(s) (secondary user). The initial user is the user who is first registered with the apparatus. The initial user is capable of generating unlimited number of users and the number assigned to the initial user is one (1). The apparatus indicates an information device such as the terminal that includes the authentication information management system. Note that the authentication information management system is not necessarily provided in the terminal such as a computer or the like. The user other than the initial user is regarded as the "user (secondary user)". The number of users is not limited and any number of users may be generated as long as the apparatus stores the information thereof.

FIG. 7 also shows exemplary user information. As the user information used at the time of the login authentication and by the authentication information management system, there is information that is set by the authentication information management system upon registration of a user identifier (login ID) and a password (login password) that identify the user. These are called as the PI value.

The PI value is a personal authentication identification value that is uniquely set with respect to each user and becomes valid when the login authentication is completed. The PI value is classified into four (4) types based on a generated timing and a confidentiality state. Different values are set to the four types of the PI values.

A PIDR-P is information generated upon registration of user information and can be referred to outside the authentication information management system. A PI DR-H is information generated upon the registration of the user information. Since the PIDR-H is encrypted with a key attached to the authentication information management system when the PIDR-H is moved to the authentication information management system, the PDR-H cannot be referred to outside the authentication information management system. A PIPR-P is information generated upon registration of the login authentication information. The PIPR-P is updated when the login authentication information is changed and can be referred to outside the authentication information management system. A PIPR-H is information generated upon the registration of the login authentication information and updated upon a change in the login authentication information. The PIPR-H is encrypted with the key attached to the authentication information management system when the PIPR-H is moved outside the authentication information management system. For the above reason, the PIPR-H cannot be referred to outside the authentication information management system. A series of four (4) pieces of information are called as the PI values.

There are a plurality of areas where the PI values are set (for example, four (4) types shown below) and these areas are selectively used depending on cases. A first area is a PI value setting area within the user information expansion area. A second area is a PI value setting area by the loadable program.

A value that is held in a data portion relating to the authentication information of user information data at the time of import of the user information is set in the PI value setting area by the loadable program. A third area is a newly generated PI value setting area. A value held by the loadable program at the time of the login authentication with use of the loadable program is set in the newly generated PI value setting area. A fourth area is a PI value setting area at the time of completion of the login authentication. The PI value generated by a request from the loadable program at the time of generation of the authentication information in the loadable program is set in the PI value setting area at the time of completion of the login authentication.

The PI value setting area at the time of completion of the login authentication is set when the login authentication is completed. If the PI value setting area at the time of completion of the login authentication is not set, this unit that the login is not completed.

Figure 8:
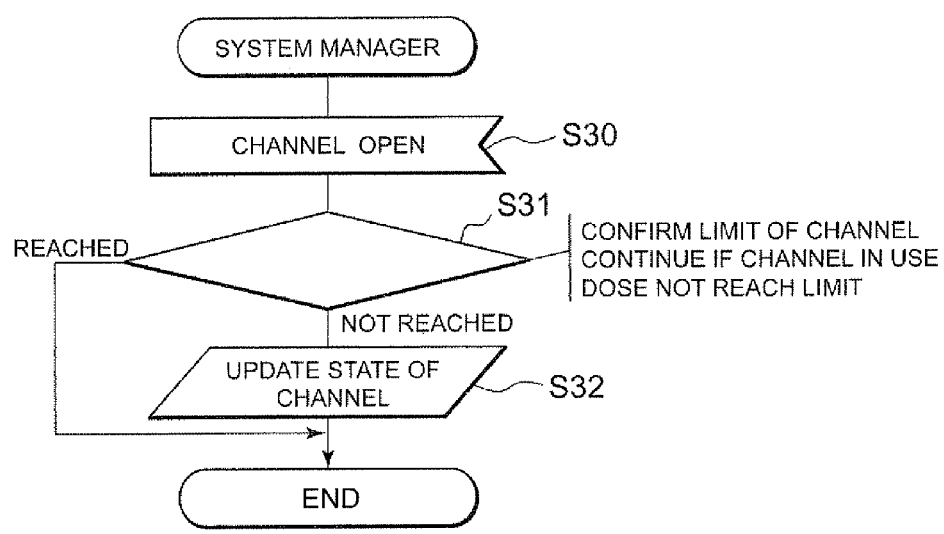
FIG. 8 shows a flowchart of a channel open.

FIG. 8 shows a flowchart pertaining to operation(s) of a channel open. Sending and receiving of the information between the software and the authentication information management system is performed with use of the channel(s) set with respect to each user. The channel specified by the user is detected in the channel open. The system manager opens the channel in operation S30. The system manager determines whether a number of the channels in-use reaches a limit or not, in operation S31. If the system manager determines that the number of the channels reaches the limit in operation S31, a process is terminated. If the system manager determines that the number of the channels does not reach the limit in operation S31, a state of the channel is updated in operation S32 and the process is terminated.

Figure 9:
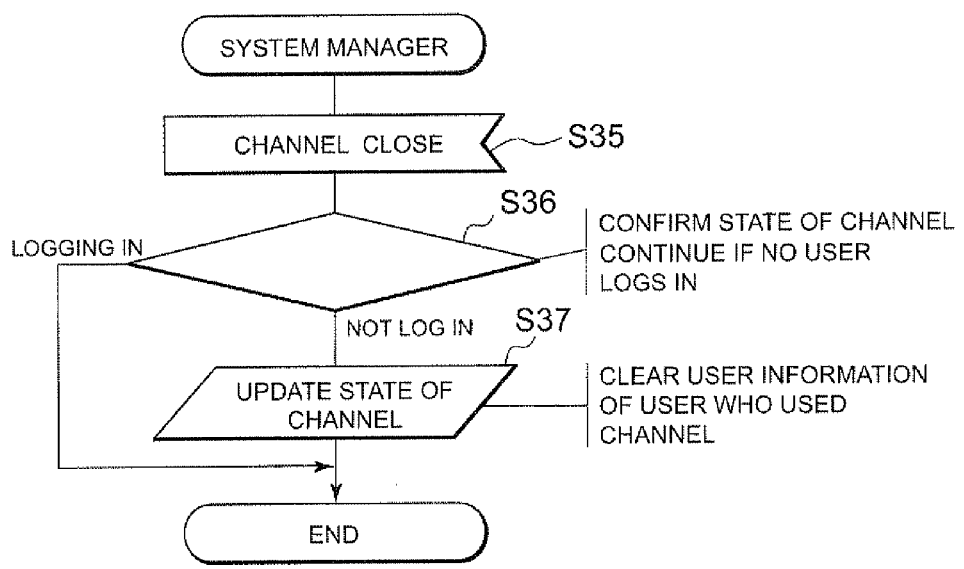
FIG. 9 shows a flowchart of a channel close.

FIG. 9 shows a flowchart pertaining to operation(s) of a channel close. The channel that has been used by the user is released in the channel close. The channel through which the user is logging in is not released. The system manager closes the channel in operation S35 and confirms the state of the channel in operation S36. If the system manager determines that the user is still logging in, the process is terminated while the channel remains maintained. In operation S36, if the system manager determines that no user is logged in, the user information used in the channel is cleared to update the state of the channel in operation S37 and the process is terminated.

FIGS. 10 to 15 show data formats when loadable program (s) are transferred. A loadable program file is transferred to the authentication information management system with the command. FIG. 10 shows exemplary data format. The data format shown in FIG. 10 includes a file version, for example, at a head of the data and an application ID of the loadable program. The application ID is an ID uniquely indicating the loadable program. The data format includes a common key data length and a common key following the application ID. The common key is used for encrypting the loadable program and encrypted with a public key. The data format includes loadable information which follows the common key and is embedded with a piece of information in the execution of the loadable program. The data format includes a loadable program data length and a loadable program body each following the loadable information. The loadable program is being encrypted with the common key. The data format includes a signature indicating that the loadable program is a legitimate program and a signature data length, each following the loadable program body.

FIG. 11 shows a content of each field in FIG. 10. FIGS. 12 and 13 show the application IDs. FIGS. 14 and 15 show loadable information.

The version of the loadable program is set to the file version, in consideration of version-upgrades in the future. If the loadable program is the encrypted program, a predefined value is set to the file version. For example, as shown in FIG. 11, "0" indicating a non-setting, "1" indicating AES 128 bits and RSA 2048 bits or "3" indicating DES-EDE2 64 bits and SHA-1 are set for the file version.

FIG. 12 shows exemplary application ID. The application ID includes a manufacturing company (manufacturer) number identifying a manufacturing company (manufacturer) and an authorization (issuance) number attached at a final stage of a program manufacturing process. The application ID has another field that serves as a reserve field. FIG. 13 indicates a content of each field shown in FIG. 12. The manufacturing company (manufacturer) number is used to identify an original manufacturer of the loadable program; for example, Fujitsu Limited corresponds to the manufacturing company (manufacturer) number 0. The authorization (issuance) number is similar to a license number of the program.

When an apparatus assembly manufacturer of the authentication information management system implements the loadable program on the system, a number assigned to the program and indicating an approval is set to the program. "0" is set for the reserve field if the reserve field is not in use.

FIG. 14 shows an exemplary format of loadable information. The loadable information includes a WORK area size, an NVRAM data area size, an NVRAM (for temporarily storing) area size, and a reserve. FIG. 15 shows a content of each field in FIG. 14. The WORK area size is a size of a work area used by an internal loadable program. The NVRAM data area size is a data area size of an NVRAM used by the internal loadable program. The NVRAM (for temporarily storing) area size is a size of the NVRAM (for temporarily storing) area used by the internal loadable program. "0" is set for the reserve field if the reserve field is not in use.

Figure 16:
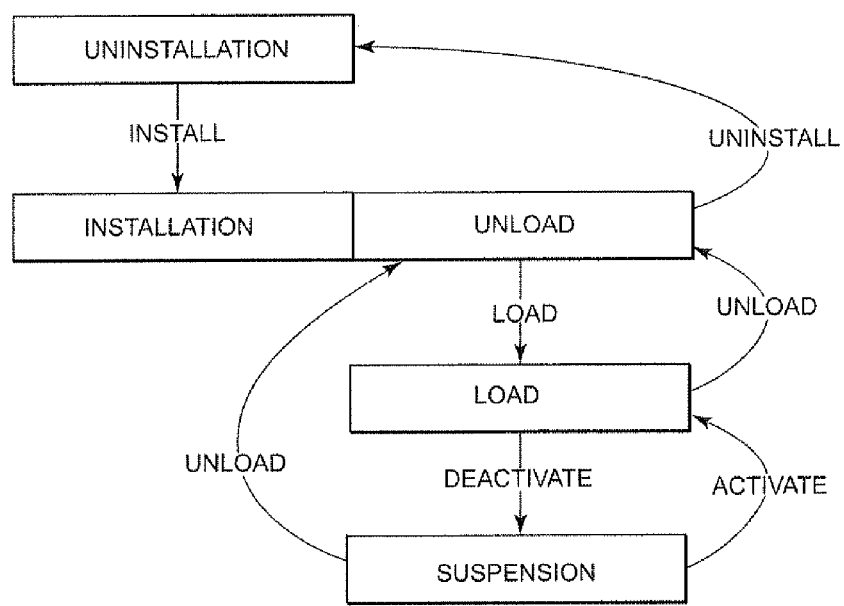
FIG. 16 shows a transition of states of a loadable program.

FIG. 16 shows transition of states of the loadable program managed by the system manager. An uninstallation state and an initial state (the loadable program is not installed) are shown here. An installation/unload indicates a state where the installation has been completed (the loadable program is not loaded). A load indicates a load state (the loadable program is being executed). Suspension indicates a state of suspension (the loadable program is suspended). A current state is selected from the above four (4) types of states and stored in the management table.

Figure 17:
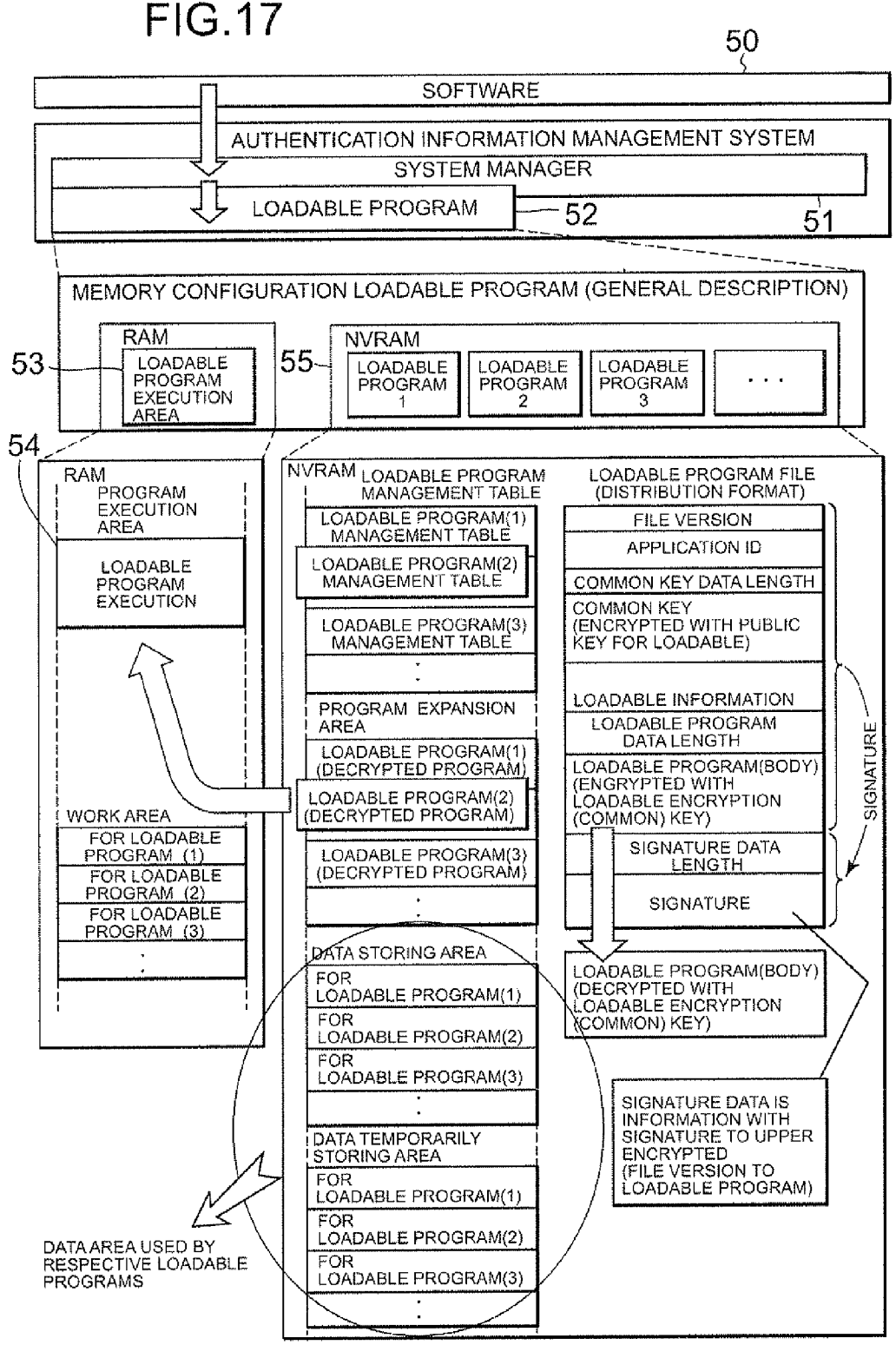
FIG. 17 shows a configuration of a memory arrangement of a loadable program.

FIG. 17 shows a configuration of a memory arrangement of the loadable program. Software 50 instructs a loadable program 52 how to operate. The loadable program 52 is expanded in a system manager 51. The loadable program 52 is stored in a NVRAM 55 and expanded in a RAM 53 when the loadable program 52 is executed. The WORK area of the loadable program 52 is also provided in the RAM 53. The NVRAM 55 stores the file version, the application ID, the common key data length, the common key, and the loadable information of a loadable program distribution file (FIG. 10), as the loadable program management table.

The NVRAM 55 includes a body of the loadable program 52, a data storing area of the loadable program, and a data temporary storing area. Each of the loadable programs uses the data storing area and the data temporary storing area. A signature data of the loadable program distribution file is such information in which the signature is appended to the encrypted data from the file version until the loadable program body.

Figure 18:
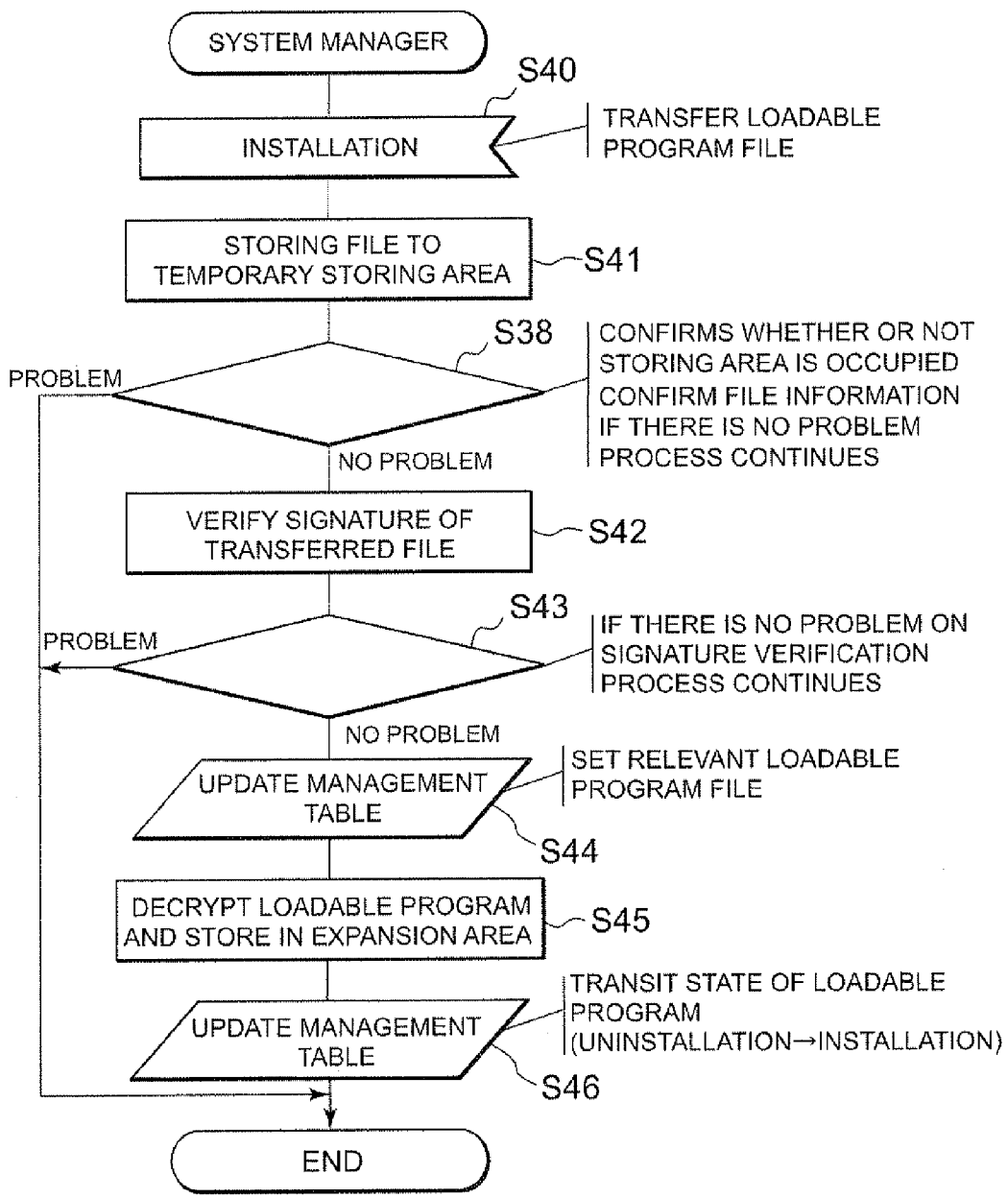
FIG. 18 shows a flowchart of installation of a loadable program.

FIG. 18 shows a flowchart of installation of the loadable program.

In the installation of the loadable program, contents of the loadable program file are confirmed and the loadable program file is copied to a temporary save area of the NVRAM. After signature verification is performed, the decrypted loadable program is stored in a program expansion memory (NVRAM). The "uninstallation" of the management table changes to the state of the "installation".

The system manager transfers the loadable program file to install in operation S40. The system manager stores the loadable program file in a temporary storing area, in operation S41. The system manager confirms whether the storing area is unoccupied or not and confirms file information in operation S38. If there is any problem, the system manager terminates a process. If there is no problem, the system manager verifies a signature of the transferred file in operation S42. As a result of the verification of the signature, the system manager determines whether there is any problem or not in operation S43. If there is any problem, the system manager terminates the process, and if there is no problem, the system manager updates the management table in operation S44. The loadable program is decrypted and stored in an expansion area in operation S45. The state of the loadable program changes to the installation state (unload state) from the uninstallation state in operation S46, the management table is updated and the process is terminated.

Figure 19:
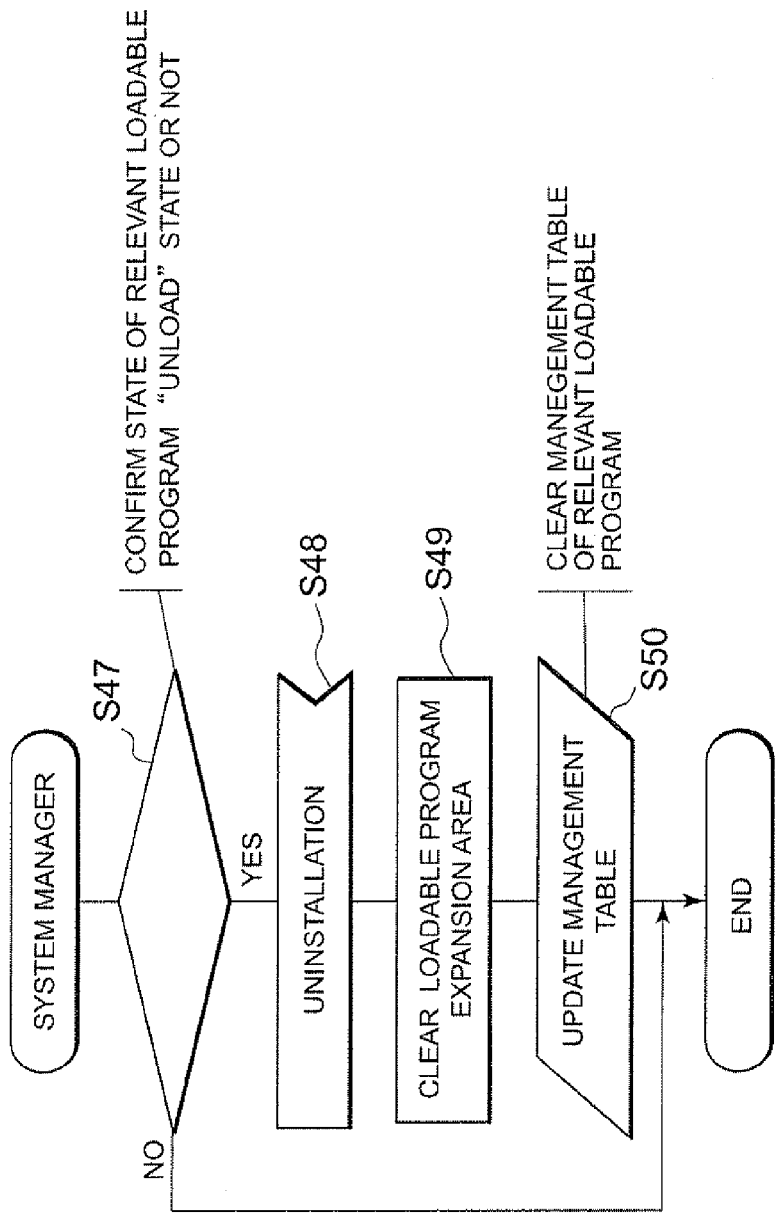
FIG. 19 shows a flowchart of uninstallation of a loadable program.

FIG. 19 shows a flowchart illustrating operation(s) related to the uninstallation of the loadable program.

The uninstallation is executed only when the state of the specified loadable program is in the "installation/unload". A program expansion area (NVRAM) for the corresponding channel and the corresponding session is cleared and the "installation/unload" of the management table makes a transition to the "uninstallation".

The system manager confirms the state of the loadable program and determines whether the state is the unload state or not in operation S47. If the state is not the unload state, the system manager terminates a process. If the state is the unload state, the system manager uninstalls the loadable program in operation S48. The system manager clears the expansion area of the loadable program in operation S49 and updates the management table in operation S50 to terminate the process.

Figure 20:
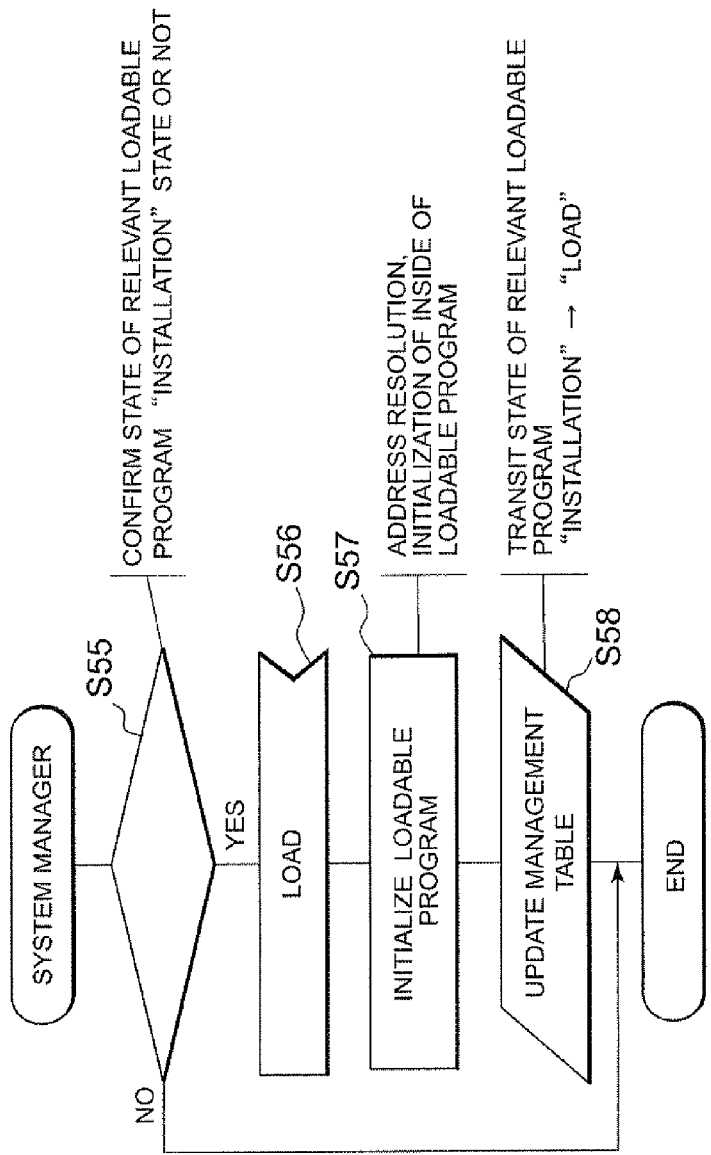
FIG. 20 shows a flowchart of a load of a loadable program.

FIG. 20 shows a flowchart of the load of the loadable program. The load is performed only when the state of the specified loadable program is "installation/unload". The loadable program is copied to a program execution memory (RAM) from the program expansion area (NVRAM) of the corresponding channel and the corresponding session and then an initialization is requested. The "installation/unload" of the management table makes a transition to "load".

The system manager confirms the state of the loadable program in operation S55 and determines whether the loadable program is in the installation state or not. The system manager terminates a process if the loadable program is not in the installation state. The system manager loads the loadable program in operation S56. The system manager initializes the loadable program in operation S57. The initialization of the loadable program includes an initialization of address resolution (see FIGS. 24 and 25), an initialization of an inside of the loadable program or the like. The system manager updates the management table and the state of the loadable program is changed from the installation state to the load state in operation S58.

Figure 21:
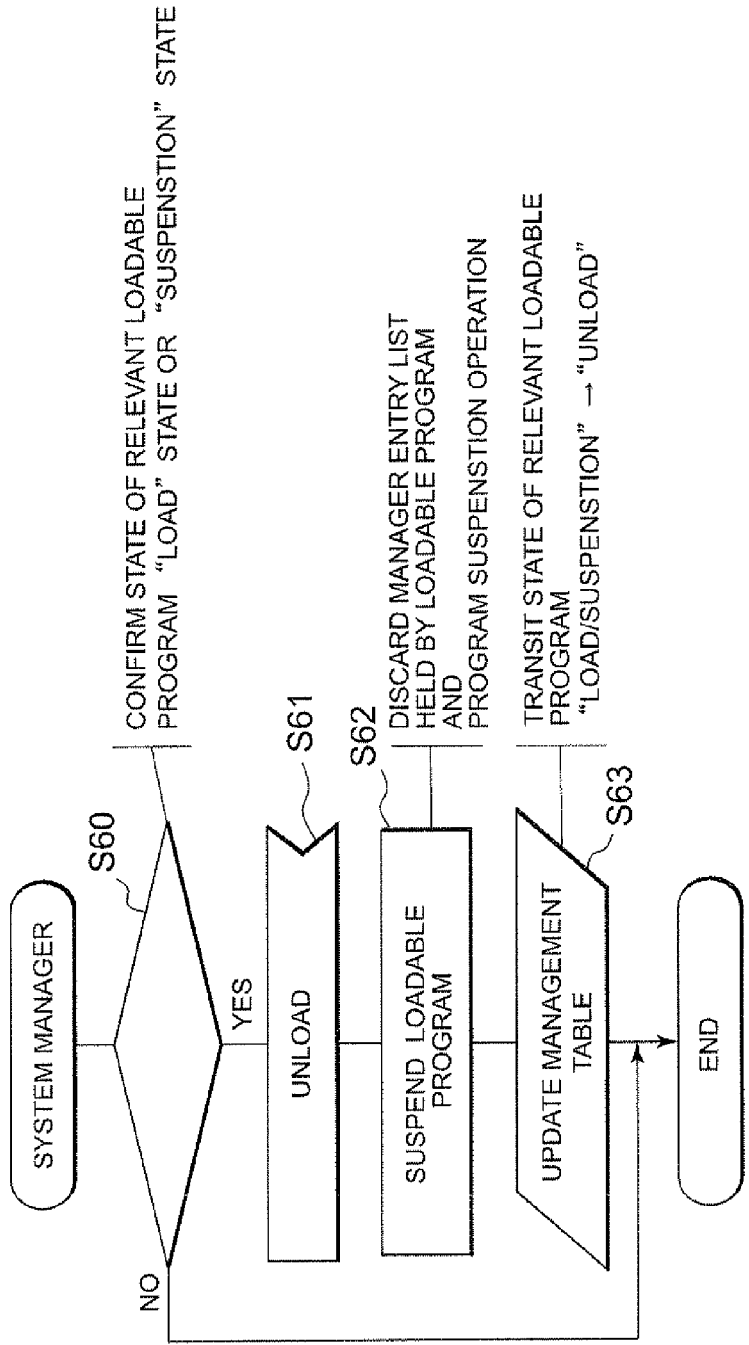
FIG. 21 shows a flowchart of an unload of a loadable program.

FIG. 21 shows a flowchart of an unload operation(s) of the loadable program. The unload is performed only when the state of the specified loadable program is the "load" or the "suspension". A request for termination is made to the program of the corresponding channel and the corresponding session. The "load/suspension" of the management table makes a transition to the "unload".

The system manager confirms the state of the loadable program and determines whether the loadable program is in the load state or the suspension state in operation S60. If the loadable program is neither in the load state nor in the suspension state based on determination in operation S60, the system manager terminates a process. If the loadable program is either in the load state or in the suspension state based on the determination in operation S60, the system manager unloads the loadable program in operation S61. A manger entry list held by the loadable program is discarded and the program is suspended in operation S62. The system manager updates the state of the loadable program of the management table to the unload state from the load/suspension state in operation S63 and terminates the process.

Figure 22:
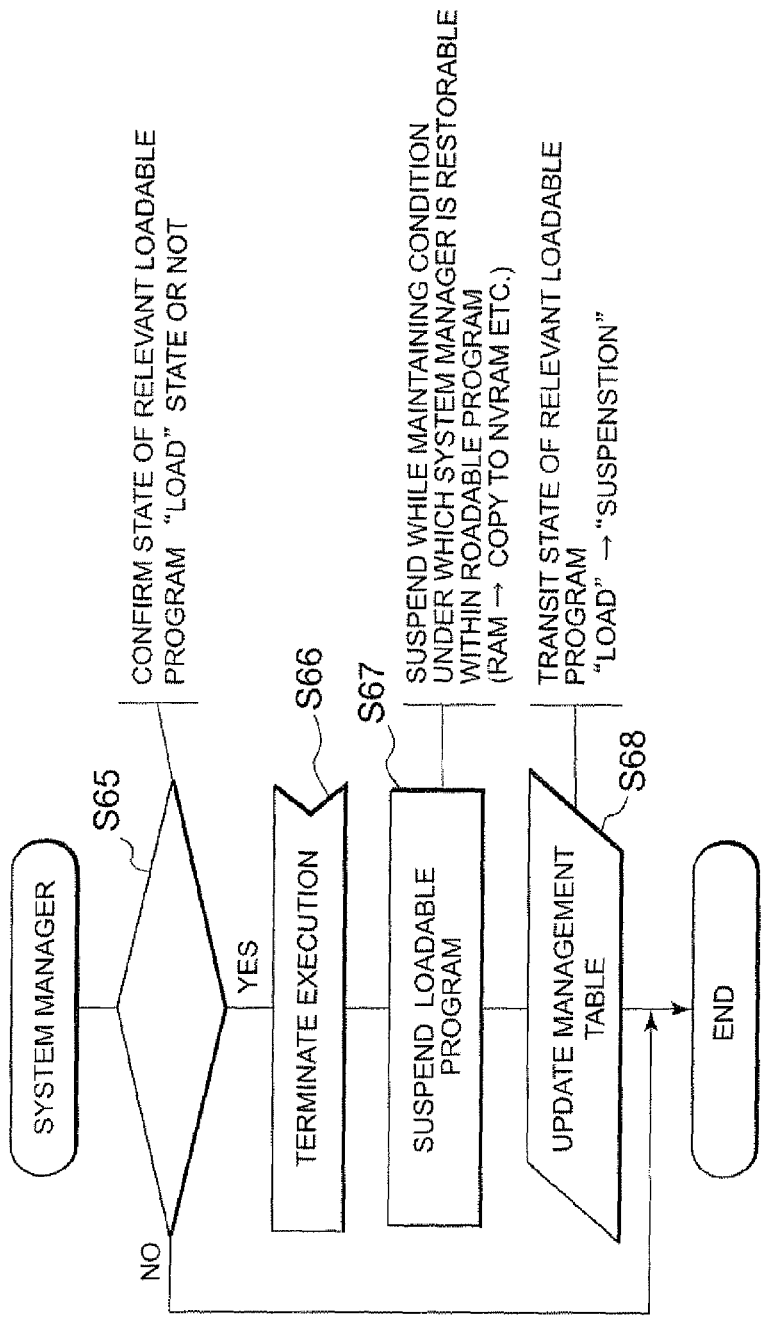
FIG. 22 shows a flowchart of suspension of a loadable program.

FIG. 22 shows a flowchart of suspension operation(s) of the loadable program.

The suspension is performed only when the state of the specified loadable program is the "load". A request for suspension is made to the program of the corresponding channel and the corresponding session. The "load" of the management table makes a transition to the "suspension".

The system manager confirms the state of the loadable program and determines whether the loadable program is in the load state or not in operation S65. If the loadable program is not in the load state, the system manager terminates a process. If the loadable program is in the load state, the system manager terminates its execution in operation S66. In operation S67, the system manager suspends the loadable program maintaining a condition where the system manager is restorable within the loadable program. For example, the program expanded in the RAM is copied to the NVRAM. The system manager changes the state of the loadable program to the suspension state from the load state in operation S68 and terminates the process.

Figure 23:
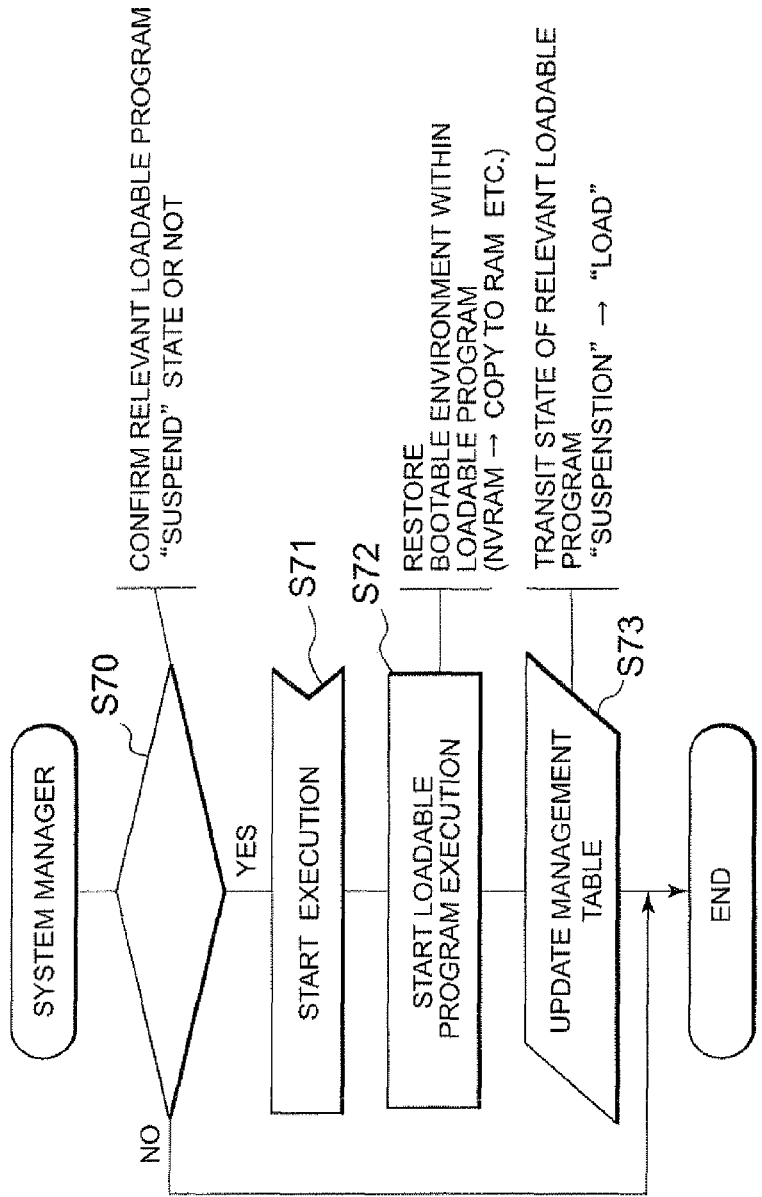
FIG. 23 shows a flowchart of a start of execution of a loadable program.

FIG. 23 shows a flowchart of a start of execution of the loadable program.

The execution is started only when the state of the specified loadable program is the "suspension". A request for starting the execution is made to the program of the corresponding channel and the corresponding session. The "suspension" of the management table makes a transition to the "load".

The system manager determines whether the state of the loadable program is the suspension state or not in operation S70. If the loadable program is not in the suspension state, the system manager terminates a process. If the system manager determines that the loadable program is in the suspension state in operation S70, the system manager starts the execution of the loadable program in operation S71. The system manager restores the loadable program to a bootable environment (area), in operation S72. For example, the loadable program is copied to the RAM from the NVRAM. The system manager changes the state of the loadable program to the load from the suspension to update the management table in operation S73 and terminates a process.

Figure 24:
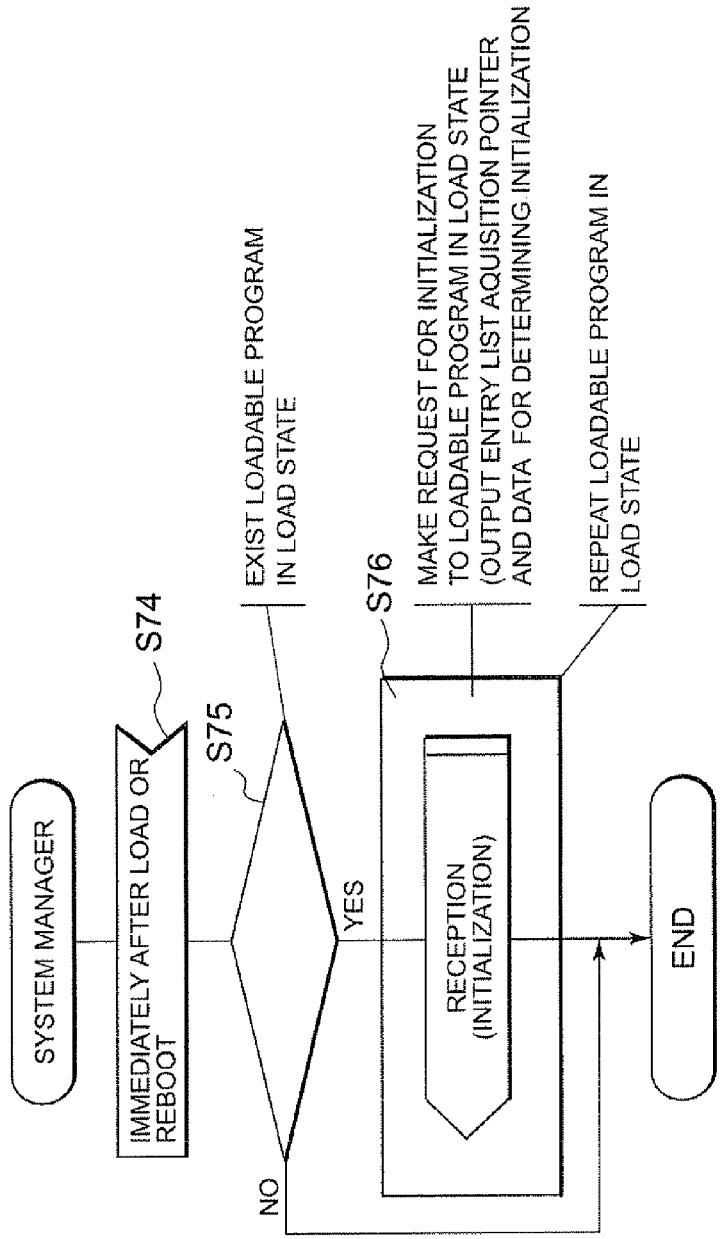
FIG. 24 shows a flowchart of address resolution of a loadable program.

FIGS. 24 and 25 show a flowchart of the address resolution of the loadable program. In order for the system manager and the loadable program to communicate with each other, boot destinations (addresses) for both of them are necessary. Therefore a mechanism in order to dynamically acquire the boot destination (addresses) is provided. If the loadable program in the load state is resident immediately after the request of load, at the time of booting by a power-on or the like, the address resolution shown in FIGS. 24 and 25 is performed.

In FIG. 24, the state in operation S74 indicates the state immediately after the load or a reboot of the loadable program. The system manager determines whether the loadable program in the load state is resident or not in operation S75. If the loadable program in the load state is not resident based on determination in operation S75, the system manager terminates a process. If the loadable program in the load state is resident based on the determination in operation S75, the system manager makes a request for initialization to the loadable program in the load state in operation S76 in a loop where the loadable programs in the load state are repeated by reaching the number of the loadable programs. The system manager outputs an entry list acquisition pointer and data for determining the initialization and then terminates the process.

Figure 25B:
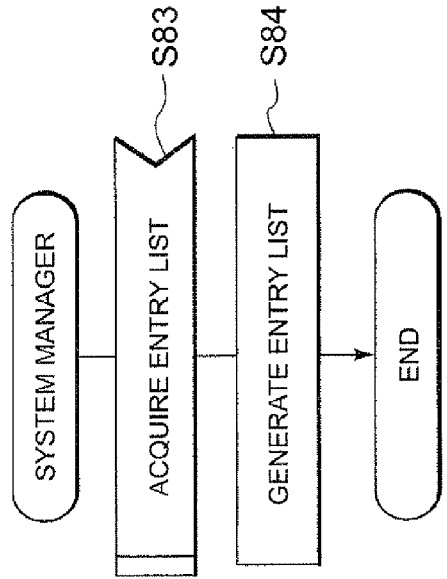
FIG. 25 shows a flowchart of address resolution of a loadable program.
Figure 25A:
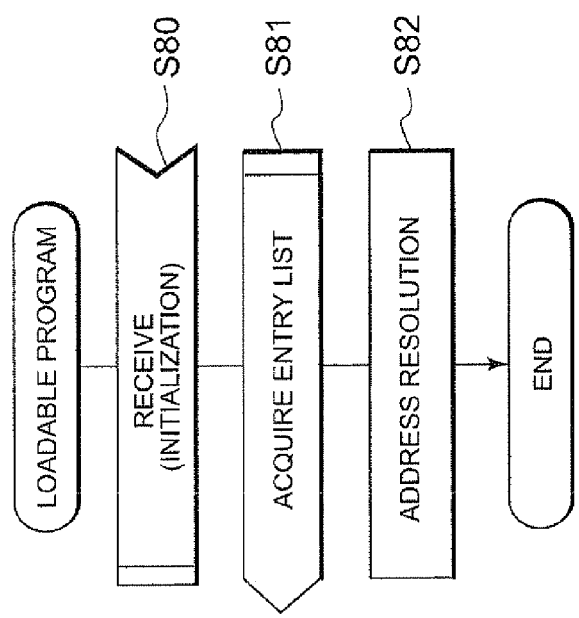

In FIG. 25A, when receiving the request for initialization in operation S80, the loadable program acquires an entry list in operation S81. The loadable program performs the address resolution in operation S82 and terminates a process.

In FIG. 25B, the system manager acquires the entry list in operation S83, generates the entry list in operation S84, and the system manager terminates the process.

Figure 26:
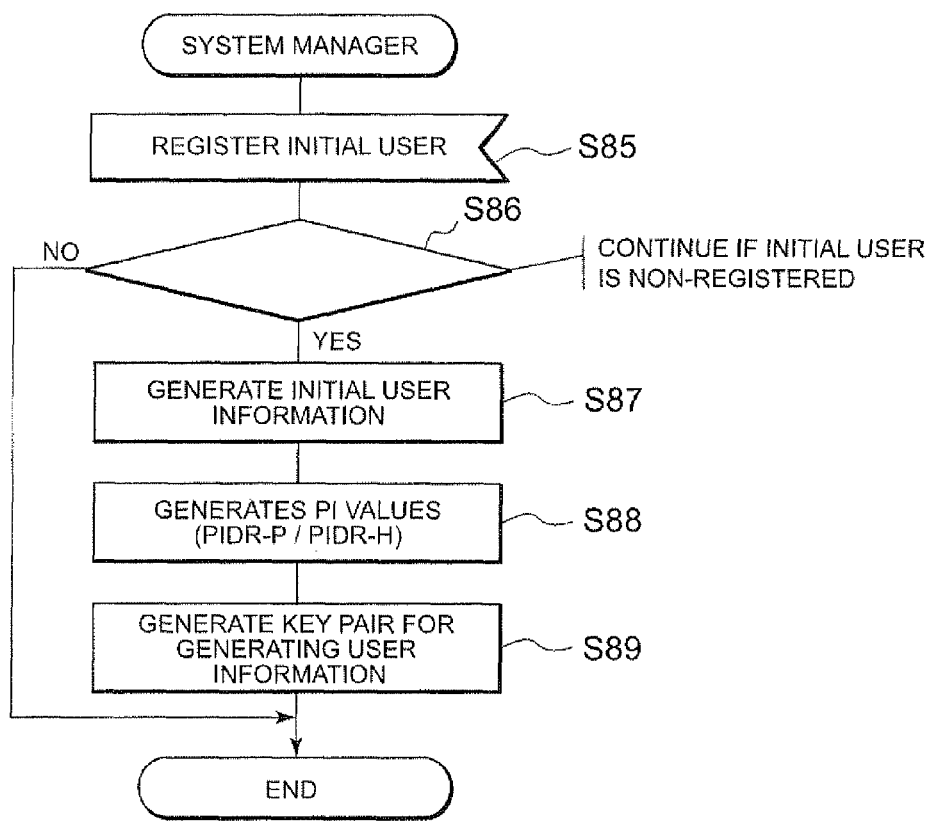
FIG. 26 shows a flowchart of registration of an initial user.

FIG. 26 shows a flowchart of the registration of the initial user.

A login is not necessary in the registration of the initial user. A key pair for generation of the user information used for importing and exporting the user information is generated. The key pair for generation of the user information is kept confidential within the authentication information management system.

The system manager registers the initial user in operation S85 and determines whether the initial user is a non-registered user or not in operation S86. When the system manager determines that the initial user is not the non-registered user in operation S86, the system manager terminates a process. When the system manager determines that the initial user is the non-registered user in operation S86, the system manager generates initial user information in operation S87 and generates the PI value (PIDR-P/PIDR-H) in operation S88. The system manager generates the key pair for generation of the user information in operation S89 and terminates the process.

Figure 27:
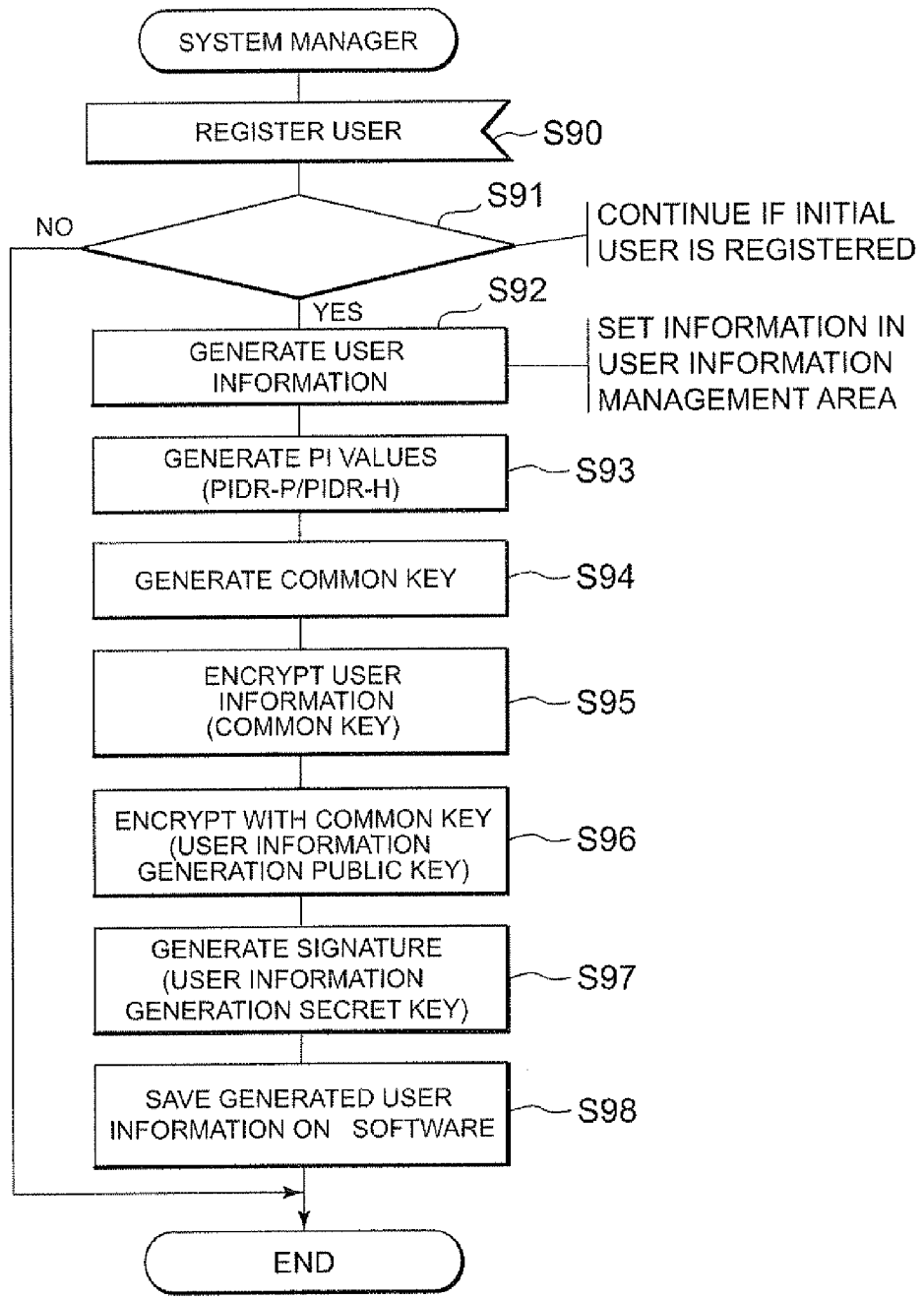
FIG. 27 shows a flowchart of registration of a user.

FIG. 27 shows a flowchart of the user registration. The initial user registers the (secondary) user of the authentication information management system. The system manager receives the registration of the (secondary) users in operation S90. The system manager determines whether the registration of the initial user has been completed or not in operation S91. If the system manager determines that the registration of the initial user has been completed in operation S91, the system manager terminates a process. If the system manager determines that the registration of the initial user has not been completed in operation S91, the system manager generates the user information in a user information storing area in operation S92, generates the PI value (PIDR-P/PIDR-H) in operation S93, and then generates the common key in operation S94. The system manager encrypts the user information with the common key in operation S95 and encrypts the common key with a public key for generation of the user information in operation S96. The system manager generates the signature with a secret key for generation of the user information in operation S97, saves the generated user information on the software in operation S98 and terminates the process. The software is the application software in an upper layer and uses the loadable program.

Figure 28:
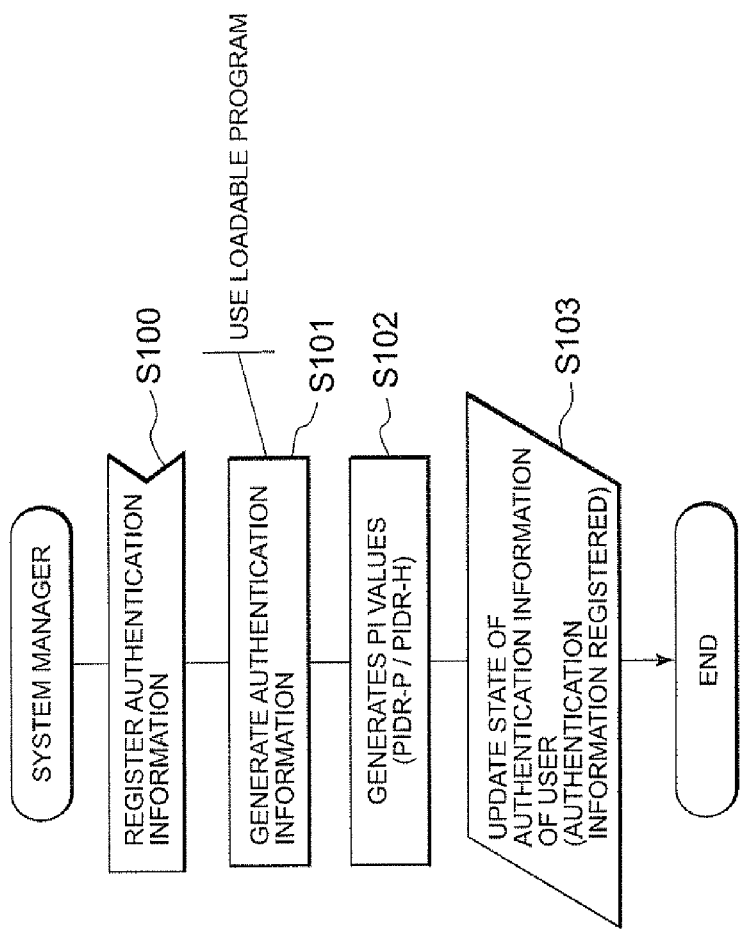
FIG. 28 shows a flowchart of registration of authentication information and a change in the authentication information of a loadable program.

FIG. 28 shows a flowchart of the registration of the authentication information and a change in the authentication information with use of the loadable program.

Upon registration of the authentication information (biometric information or the like), it is necessary that the login authentication be completed. The (secondary) user registers the authentication information in order to perform the login authentication with the loadable program after the user information by the initial user has been generated.

The system manager accepts the registration of the authentication information in operation S100 and generates the authentication information using the loadable program in operation S101. The system manager generates the PI value (PIPR-P/PIPR-H) in operation S102. If the authentication information has been registered in operation S103, the system manager updates the authentication information of the user and terminates a process.

FIG. 29 shows a configuration of the user information file. The user information file includes a common key encrypted with the public key for generation of the user information, personal data (login authentication information, user resource such as the encryption key unique to each user etc.) encrypted with the common key, and signature data generated with the secret key for generation of the user information.

Figure 30:
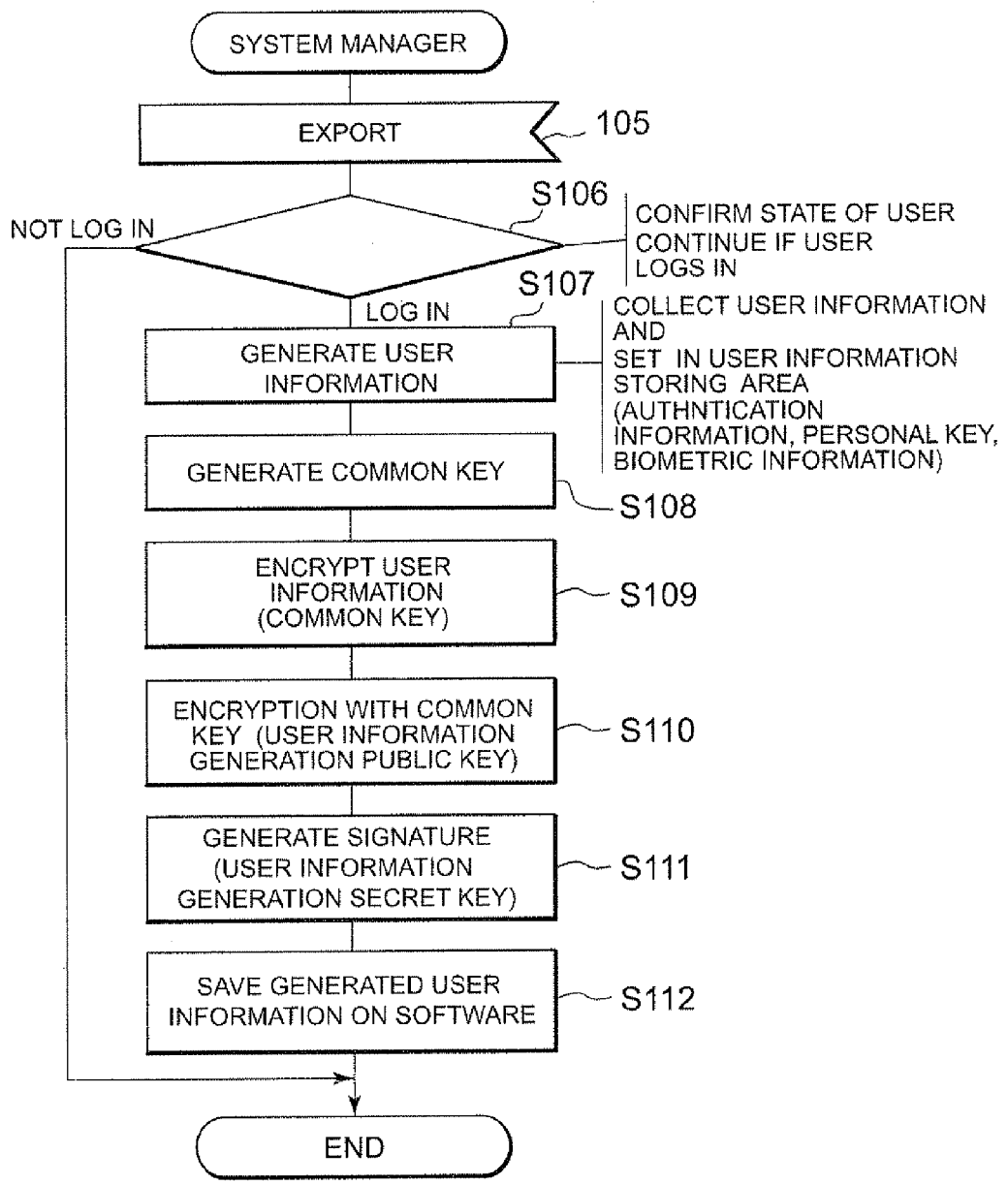
FIG. 30 shows a flowchart of exporting an initial user information and user information.

FIG. 30 shows a flowchart of the export of the initial user information and the user information. A user login is not necessary in exporting the user information upon the registration of the initial user. The login authentication is indispensable after the registration of the initial user has completed. Upon a change in the user information, the export of the user information needs to be performed. The user information file encrypted within the authentication information management system is exported to the software.

The system manager exports the user information to the PC hard disk or the like from the chip in the authentication information management system in operation S105. The system manager confirms the state of the user in operation S106. If the user has logged in, a process goes to operation S107, and if the user has not logged in, the process is terminated. In operation S107, the system manager collects the user information and sets the authentication information, a personal key, the biometric information or the like to a user information storing area, thereby generating the user information. The system manager generates the common key in operation S108, encrypts the user information with the common key in operation S109, and encrypts the common key with the public key for generation of the user information in operation S110. The system manager generates the signature with the secret key for generation of the user information in operation S111, saves the generated user information on the software in operation S112 and terminates the process.

The software is the application software in the upper layer and uses the loadable program.

Figure 31:
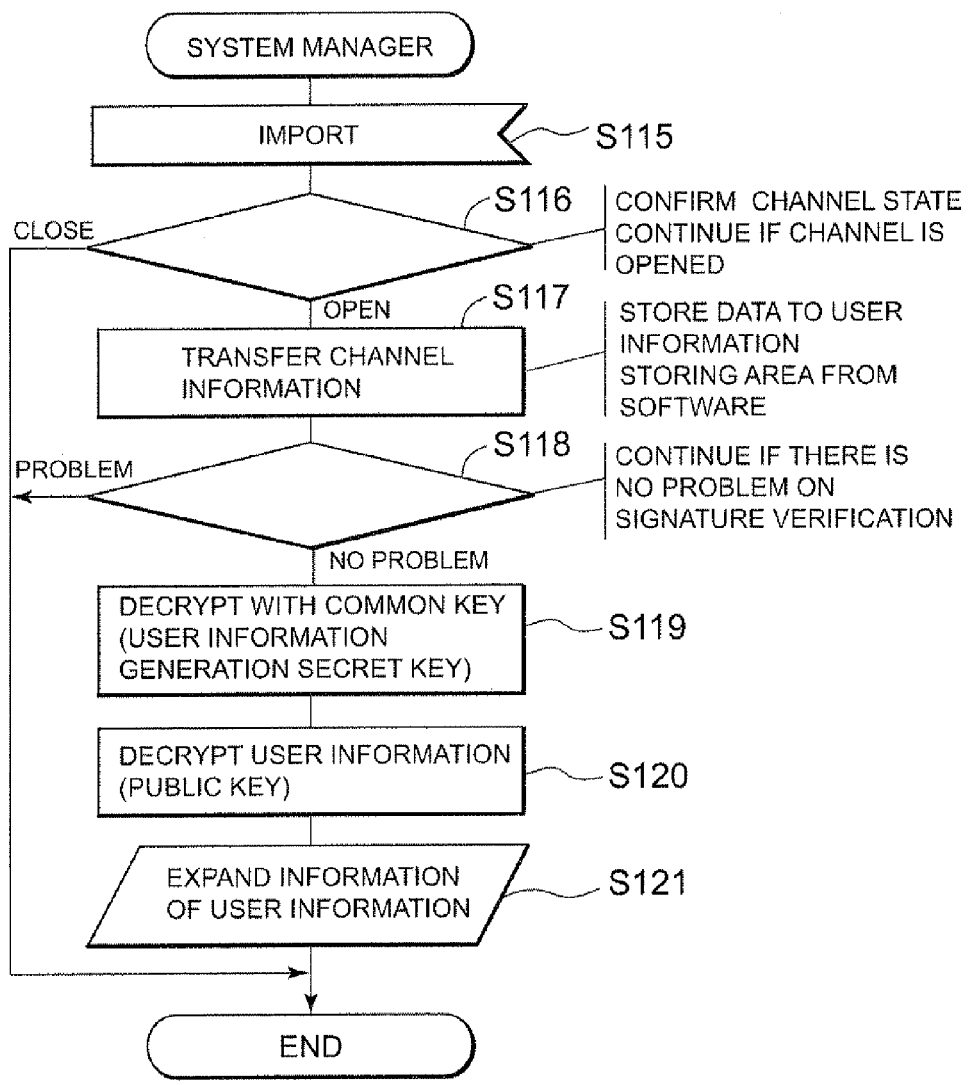
FIG. 31 shows a flowchart of importing an initial user information and the user information.

FIG. 31 shows a flowchart of the import of the initial user information and the user information. Before the user logs in, the user information file exported to the software is imported to the authentication information management system. This import is performed after the channel open.

The system manager imports the user information in operation S115 and confirms the state of the channel in operation S116. If the channel is closed, the system manager terminates a process. If the channel is open, the system manager transfers the user information to the user information storing area from the software in operation S117 and stores the user information. The system manager performs verification of the signature in operation S118. If there is a problem with the signature, the system manager terminates the process. If there is no problem with the signature, the system manager encrypts the common key with the secret key for generation of the user information in operation S119 and decrypts the user information with the common key in operation S120. The system manager releases information about the user information in operation S121, thereby terminating the process.

Figure 32:
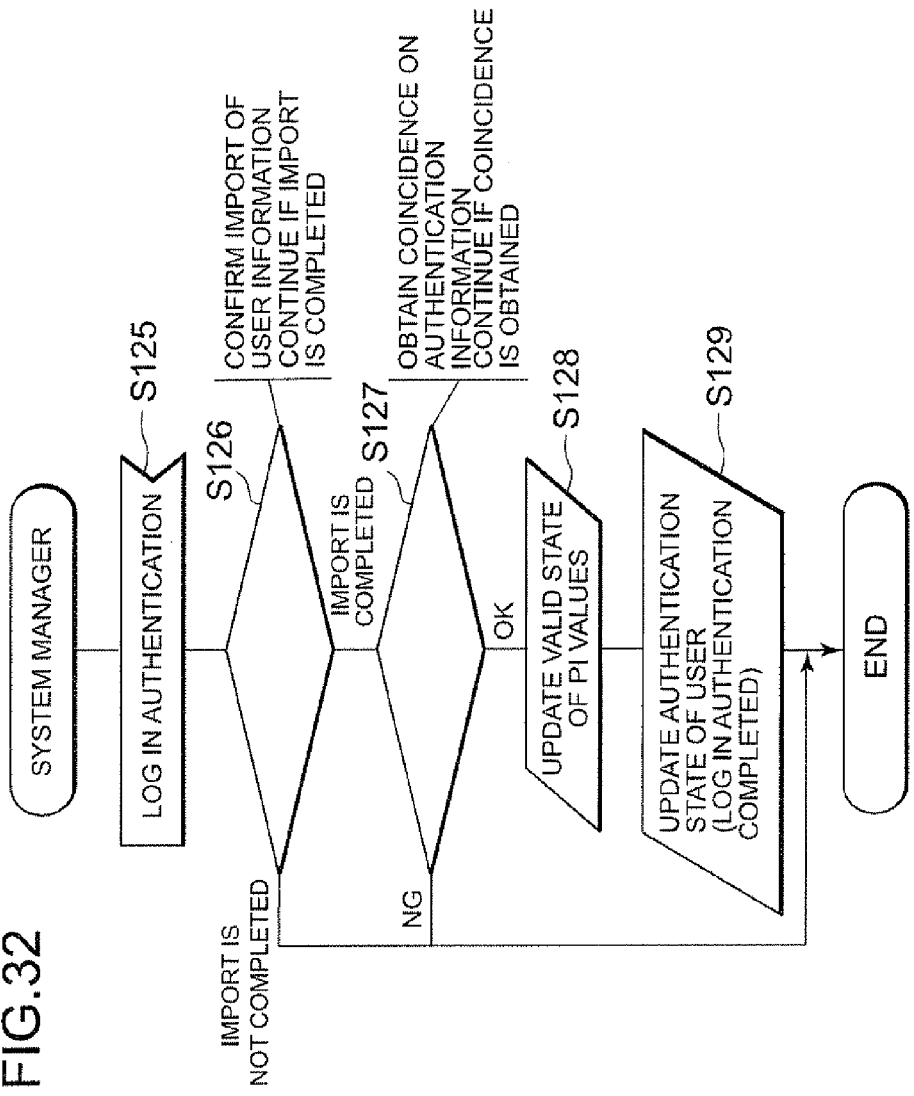
FIG. 32 shows a flowchart of login authentication.

FIG. 32 shows a flowchart of the login authentication. When the user starts the use of the authentication information management system, a login process is performed. After the completion of the login authentication, the change in the authentication information of the user and the generation of the resource (key, certificate, etc.) may be available.

The system manager performs the login authentication with use of an ID input by the user and the authentication information (biometric information/password) in operation S125. The system manager determines whether the import of the user information has completed or not in operation S126. If the system manager determined that the import has not been completed in operation S126, the system manager terminates a process. If the system manager determines that the import has been completed in operation S126, collation of the authentication information is performed in operation S127 to determine whether the authentication coincides. If the authentication in operation S127 is not correct, the system manager terminates the process. If the authentication in operation S127 is correct, the system manager updates the valid state of the PI value in operation S128. The system manager updates an authentication state of the user (whether the login authentication has been completed or not) in operation S129 and terminates the process.

Figure 33:
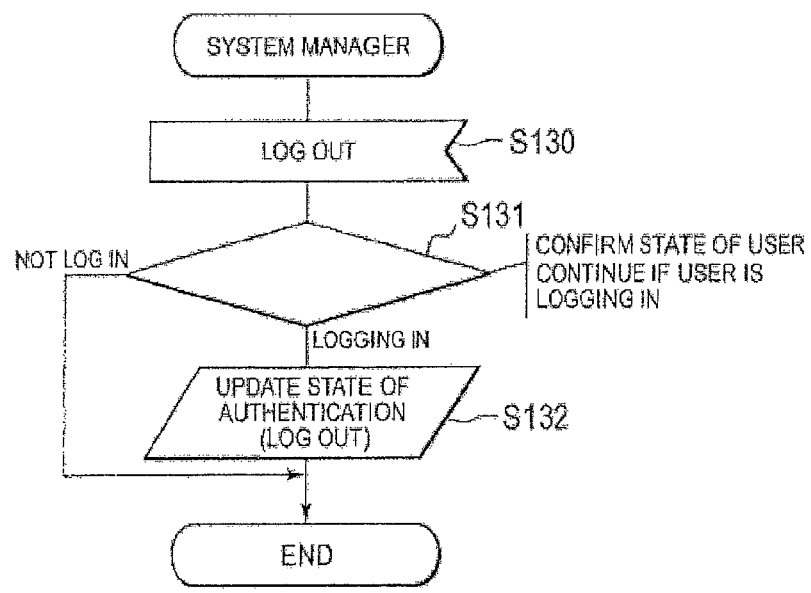
FIG. 33 shows a flowchart of a logout.

FIG. 33 shows a flowchart of the logout. When the user terminates use of the authentication information management system, the logout process is performed. The system manager performs the logout process in operation S130 and determines whether the user is logging in or not in operation S131. In operation S131, if the system manager determines that there is no user who is logging in, the system manager terminates the process. If the system manager determines in operation S131 that there is a user who is logging in, the system manager updates the authentication state of the user to the logout in operation S132 and terminates the process.

Figure 34:
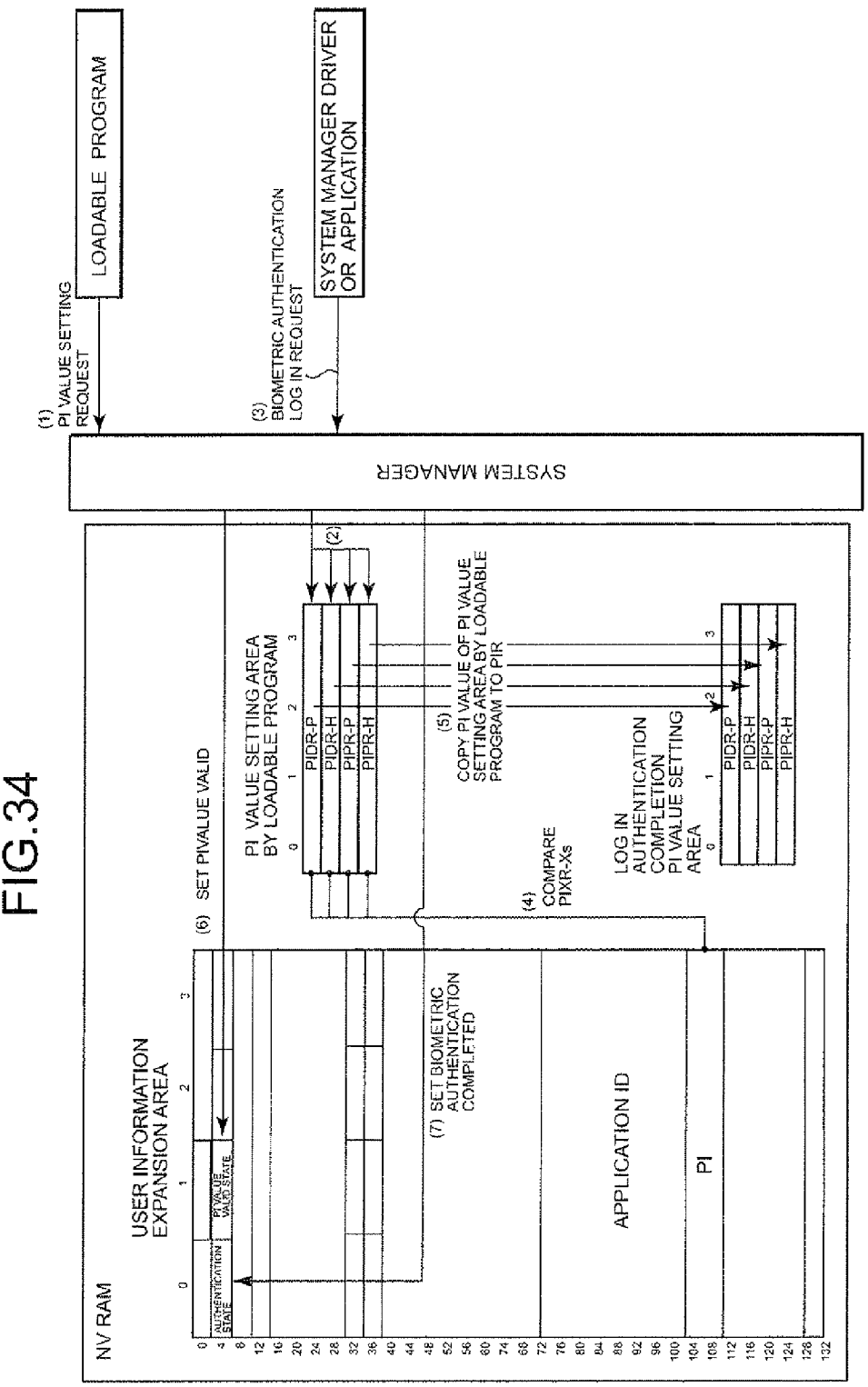
FIG. 34 shows a valid setting of a PI value at a time of the login authentication.

FIG. 34 shows valid setting for the PI value at the time of the login authentication. The loadable program makes a request for setting the PI value to the system manager at the time of completion of collation of the biological authentication information (1). The system manager stores the PI value transferred from the loadable program in the PI value setting area of the corresponding loadable program (2). A system manager/driver or the application makes a request for a biological authentication login to the system manager (3). The system manager compares a PIXR-X value stored in the PI value setting area of the loadable program with a PIXR-X of its own within the user information expansion area (4). If the both PIXR-Xs match with each other, it is regarded that the authentication is satisfied and the PI value in the PI value setting area of the loadable program is copied to the PI value setting area (PIR) at the time of the completion of the login authentication (5).

The system manager sets a "PI value valid state" of the user information expansion area to valid (6). The system manager sets the "authentication state" of the user information to an authenticated state (7). The PIXR-X is the reference symbol that collectively indicates PIDR-P or the like.

Figure 35:
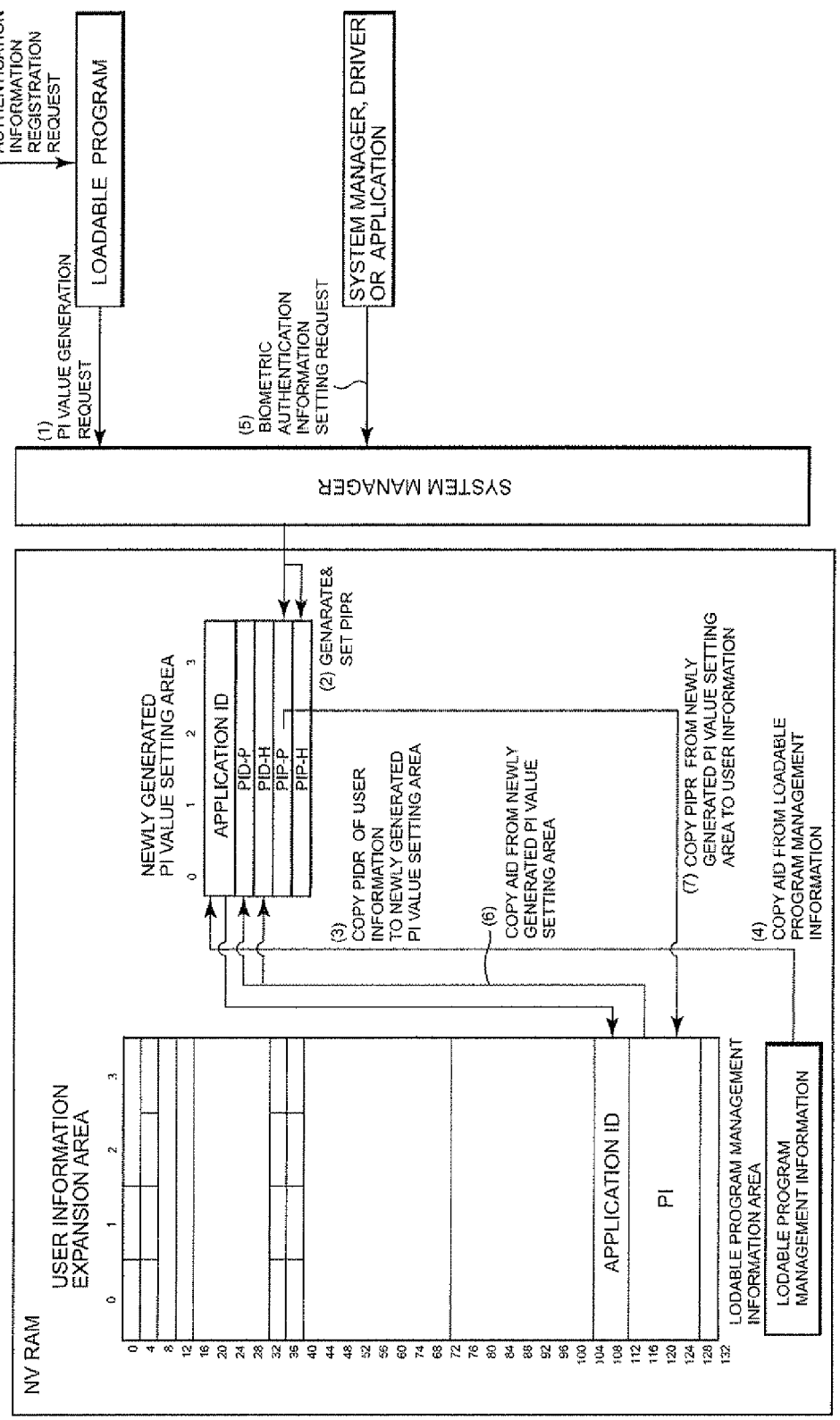
FIG. 35 shows registration of biological authentication information.

FIG. 35 shows registration of the biological authentication information. Upon completion of generation of the biological authentication information, the loadable program sends a PI value generation request command to the system manager (1). The system manager generates the PI value (PIPR-P/PIPR-H) to set the PI value to the newly generated PI value setting area. The system manager copies the PIDR-P/PIDR-H of the user information to the newly generated PI value setting area (3). The PIDR-P/PIDR-H is being generated upon the generation of the user information. The system manager searches an active program (program(s) expanded on an execution area) from the loadable program management table and copies the corresponding application ID to the newly generated PI value setting area (4). The system manager/drive or the application makes the request for setting the biological authentication information to the system manager (5). The system manager copies an AID to the user information from the newly generated PI value setting area (6). The system manager copies a PIP value to the user information from the newly generated PI value setting area (7). Upon completion of the copying to the user information, the content of the setting in the newly generated PI value setting area is cleared.

The embodiment prevents user impersonation in the authentication information management system. In the embodiment, since the user information is not stored within the authentication information management system but stored in an external memory unit to transfer (import) the user information as necessary and the loadable programs is transposable, a capacity (memory capacity) of the memory unit within the authentication information management system may be reduced and a cost of the chip may be reduced.

Example embodiments of the present invention have now been described in accordance with the above advantages. It will be appreciated that these examples are merely illustrative of the invention. Thus, although a few embodiments have been shown and described, it would be appreciated by those skilled in the art that changes may be made in these embodiments without departing from the principles and spirit of the invention, the scope of which is defined in the claims and their equivalents.

The invention claimed is:

1. An authentication device of a semiconductor chip sending and receiving authentication information, the authentication device comprising:
   a login unit to perform a login process permitting an input to the semiconductor chip and an output from the semiconductor chip;
   a loadable program unit to install and uninstall a loadable program and control acquisition of the authentication information;
   a control unit to control installation or uninstallation of the loadable program so as to replace an authentication program, and to control assignment of a session to the loadable program unit, and use of the loadable program based on the session; and
   a command process unit to open and close a channel for sending and receiving information to and from the semiconductor chip and update a state of the channel based on a number of channels in-use.

2. The authentication device according to claim 1, wherein the command process unit registers the updated state of the channel.

3. The authentication device according to claim 1, wherein a user uses the loadable program via a channel.

4. The authentication device according to claim 1, comprising:
   a registration unit to register a user who uses the authentication device.

5. The authentication device according to claim 3, wherein the user is a first user having registration authority or a second user registered by the first user.

6. The authentication device according to claim 1, wherein the control unit includes a first information storing unit that stores information of a user, a channel assigned to the user, and the loadable program unit.

7. The authentication device according to claim 6, wherein the first information storing unit stores authentication information of the user acquired by the loadable program unit.

8. The authentication device according to claim 1, wherein the control unit includes a second information storing unit related to the session and the loadable program unit.

9. The authentication device according to claim 8, wherein the second information storing unit stores information indicating a state of the loadable program.

10. The authentication device according to claim 9, wherein the state of the loadable program includes at least one of an uninstallation state, an installation/unload state, a load state, and a suspension state.

11. The authentication device according to claim 1, wherein the loadable program is a program that processes the authentication information.

12. The authentication device according to claim 11, wherein the authentication information is one of a password and biometric information.

13. The authentication device according to claim 1, wherein the authentication information and a resource generated in the authentication device are encrypted with an encryption key corresponding to user information and the encrypted authentication information and resource are sent to outside of the semiconductor chip.

14. The authentication device according to claim 3, wherein the authentication information is decrypted with a decryption key corresponding to the user after receiving the authentication information.

15. A method of controlling authentication comprising:
  importing user information to an authentication device that is provided in a semiconductor chip, the user information including installable and uninstallable loadable program to replace an authentication program;
  performing a login for communication with the semiconductor chip;
  registering authentication information of a user subjected to the login;
  generating a resource pertaining to the user;
  exporting the authentication information and the resource to outside of the semiconductor chip;
  opening or closing a channel exchanging information with the semiconductor chip; and
  updating a state of the channel based on a number of channels in-use.

16. The method of controlling authentication according to claim 15, wherein the resource includes a key unique to the user.

17. The method of controlling authentication according to claim 15, comprising:
  performing the importing after opening a channel for sending and receiving information to and from the semiconductor chip, and
  closing the opened channel after the exporting.

18. The method of controlling authentication according to claim 15, comprising:
  comparing first authentication information generated when registering the user with second authentication information acquired when performing the login.

19. The method of controlling authentication according to claim 15, wherein the authentication information is one of a password program and a biometric program.

20. The authentication device according to claim 1, wherein the command process unit updates the state of the channel when the number of the channels in-use reaches a limit value.

21. The method according to claim 15, wherein the state of the channel is undated when the number of the channels in-use reaches a limit value.

22. The method according to claim 15, comprising:
  registering the updated state of the channel.

* * * * *